United States Patent
Kim et al.

(10) Patent No.: US 11,556,795 B2
(45) Date of Patent: Jan. 17, 2023

(54) COMPUTING DEVICE FOR TRAINING ARTIFICIAL NEURAL NETWORK MODEL, METHOD OF TRAINING THE ARTIFICIAL NEURAL NETWORK MODEL, AND MEMORY SYSTEM FOR STORING THE SAME

(71) Applicant: Samsung Electronics Co., Ltd., Suwon-si (KR)

(72) Inventors: Byeoungsu Kim, Suwon-si (KR); Sangsoo Ko, Suwon-si (KR); Kyoungyoung Kim, Suwon-si (KR); Jaegon Kim, Suwon-si (KR); Sanghyuck Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 534 days.

(21) Appl. No.: 16/786,627

(22) Filed: Feb. 10, 2020

(65) Prior Publication Data

US 2020/0356860 A1    Nov. 12, 2020

(30) Foreign Application Priority Data

May 8, 2019    (KR) .................. 10-2019-0053888

(51) Int. Cl.
*G06N 3/08* (2006.01)
*G06K 9/62* (2022.01)

(52) U.S. Cl.
CPC .......... *G06N 3/082* (2013.01); *G06K 9/6215* (2013.01); *G06K 9/6263* (2013.01)

(58) Field of Classification Search
CPC ..... G06N 3/082; G06K 9/6215; G06K 9/6263
See application file for complete search history.

(56) References Cited

U.S. PATENT DOCUMENTS

| 5,636,326 A | 6/1997 | Stork et al. |
| 8,831,763 B1 | 9/2014 | Sharifi et al. |

(Continued)

OTHER PUBLICATIONS

Karnin, "A Simple Procedure for Pruning Back-Propagation Trained Neural Networks", 1990, IEEE Transactions on Neural Networks. vol. I. No. 2., pp. 239-242 (4 pages) (Year: 1990).*

(Continued)

*Primary Examiner* — David F Dunphy
(74) *Attorney, Agent, or Firm* — Muir Patent Law, PLLC

(57) ABSTRACT

A computing device for training an artificial neural network model includes: a model analyzer configured to receive a first artificial neural network model and split the first artificial neural network model into a plurality of layers; a training logic configured to calculate first sensitivity data varying as the first artificial neural network model is pruned, calculate a target sensitivity corresponding to a target pruning rate based on the first sensitivity data, calculate second sensitivity data varying as each of the plurality of layers is pruned, and output, based on the second sensitivity data, an optimal pruning rate of each of the plurality of layers, the optimal pruning rate corresponding to the target pruning rate; and a model updater configured to prune the first artificial neural network model based on the optimal pruning rate to obtain a second artificial neural network model, and output the second artificial neural network model.

20 Claims, 17 Drawing Sheets

(56) References Cited

U.S. PATENT DOCUMENTS

| | | |
|---|---|---|
| 8,856,055 B2 | 10/2014 | Brezzo et al. |
| 2007/0133870 A1 | 6/2007 | Hu |
| 2016/0026913 A1 | 1/2016 | Moon et al. |
| 2016/0358070 A1 | 12/2016 | Brothers et al. |
| 2018/0046914 A1 | 2/2018 | Li et al. |
| 2018/0114114 A1 | 4/2018 | Molchanov et al. |
| 2018/0181867 A1 | 6/2018 | Seibold et al. |
| 2019/0005377 A1 | 1/2019 | Malaya |
| 2019/0362235 A1* | 11/2019 | Xu .................. G06N 3/084 |

OTHER PUBLICATIONS

Zurada et al, "Sensitivity Analysis for Minimization of Input Data Dimension for Feedforward Neural Network", 1994, Proceedings of IEEE International Symposium on Circuits and Systems—ISCAS '94, pp. 447-450 (4 pages) (Year: 1994).*

Office Action, dated Aug. 25, 2021, from the German Patent and Trademark Office for corresponding DE Patent Application No. 102020101275.6 (6 pages) and English-language translation of the same (6 pages).

Huan Wang, Qiming Zhang, Yuehai Wang, and Roland Hu, "Structured Deep Neural Network Pruning by Varying Regularization Parameters," arXiv:1804.09461, Apr. 2018 (7 pages).

Song Han, Jeff Pool, John Tran, and William J. Dally, "Learning both Weights and Connections for Efficient Neural Networks," arXiv:1506.02626, Oct. 2015 (9 pages).

Yihui He, Xiangyu Zhang, and Jian Sun, "Channel Pruning for Accelerating Very Deep Neural Networks," arXiv:1707.06168, Aug. 2017 (10 pages).

* cited by examiner

COMPUTING DEVICE FOR TRAINING ARTIFICIAL NEURAL NETWORK MODEL, METHOD OF TRAINING THE ARTIFICIAL NEURAL NETWORK MODEL, AND MEMORY SYSTEM FOR STORING THE SAME

CROSS-REFERENCE TO RELATED APPLICATION

This application claims the benefit of Korean Patent Application No. 10-2019-0053888, filed on May 8, 2019, in the Korean Intellectual Property Office, the disclosure of which is incorporated herein in its entirety by reference.

BACKGROUND

The inventive concept relates to a computing device for training an artificial neural network model by adjusting a pruning rate based on the sensitivity of the artificial neural network model, a method of training the artificial neural network model, and a memory system for storing the artificial neural network model.

An artificial neural network (ANN) refers to computational architecture which is modeled after the biological brain. Deep learning or machine learning may be realized based on an ANN. A deep neural network or deep learning, which are examples of an ANN, may have a multi-layer structure including a plurality of layers. Recently, the amount of operations to conduct using an ANN has remarkably increased, and thus, the amount of data used to train an ANN has increased and the need for training an ANN with less data has emerged.

SUMMARY

The inventive concept provides a computing device including a method of training an artificial neural network model accurately by using a small amount of data by considering the sensitivity of each layer of an artificial neural network, the sensitivity varying according to a pruning rate, and a memory system.

According to an aspect of the inventive concept, there is provided a computing device for training an artificial neural network model, the computing device including: a model analyzer configured to receive a first artificial neural network model and split the first artificial neural network model into a plurality of layers; training logic configured to calculate first sensitivity data varying as the artificial neural network model is pruned, calculate a target sensitivity corresponding to a target pruning rate based on the first sensitivity data, calculate second sensitivity data varying as each of the plurality of layers of the first artificial neural network model is pruned, and output, based on the second sensitivity data, an optimal pruning rate of each of the plurality of layers, the optimal pruning rate corresponding to the target pruning rate; and a model updater configured to prune the first artificial neural network model based on the optimal pruning rate to obtain a second artificial neural network model, and output the second artificial neural network model.

According to another aspect of the inventive concept, there is provided a computing device for training an artificial neural network model, the computing device including: a model analyzer configured to receive a first artificial neural network model and split the first artificial neural network model into a plurality of layers; training logic configured to receive a target pruning rate, calculate a target sensitivity of the first artificial neural network model, the target sensitivity corresponding to the target pruning rate, and output an optimal pruning rate of each of the plurality of layers, the optimal pruning rate corresponding to the target sensitivity; and a model updater configured to prune the first artificial neural network model based on the optimal pruning rate to obtain a second artificial neural network model, and output the second artificial neural network model.

According to another aspect of the inventive concept, there is provided a method of training an artificial neural network model, the method including: receiving a target pruning rate; pruning a first artificial neural network model; calculating first sensitivity data varying according to a pruning rate of the first artificial neural network model as the first artificial neural network model is pruned; calculating a target sensitivity corresponding to the target pruning rate from the first sensitivity data; splitting the first artificial neural network model into a plurality of layers; calculating second sensitivity data varying as each of the plurality of layers is pruned; calculating an optimal pruning rate of each of the plurality of layers corresponding to the target sensitivity, based on the second sensitivity data; pruning the first artificial neural network model based on the optimal pruning rate to obtain a second artificial neural network model; and outputting the second artificial neural network model.

According to another aspect of the inventive concept, there is provided a memory system for processing an artificial neural network model including a plurality of layers, the memory system including: a host processor; and a plurality of logic layers configured to communicate with the host processor, wherein each of the plurality of logic layers is electrically connected to a memory stack, and wherein the host processor is configured to receive an original weight of each of the plurality of layers, receive memory addresses, output the original weight to a first logic layer in which a first memory stack corresponding to at least some of the memory addresses is included, and output a pruning rate corresponding to the original weight output to the first logic layer, and wherein the first logic layer is configured to calculate a sensitivity based on at least one of the original weight and the pruning rate and store at least one of the original weight, the pruning rate, and the sensitivity in the first memory stack.

According to another aspect of the inventive concept, there is provided a non-transitory computer-readable recording medium having recorded thereon a program for pruning an artificial neural network model including a plurality of layers, the program including: receiving a target pruning rate; pruning a first artificial neural network model; calculating first sensitivity data varying according to a pruning rate of the first artificial neural network model; calculating, from the first sensitivity data, a target sensitivity corresponding to the target pruning rate; splitting the first artificial neural network model into a plurality of layers; calculating second sensitivity data varying according to a pruning rate of each of the plurality of layers; calculating an optimal pruning rate of each of the plurality of layers corresponding to the target sensitivity based on the second sensitivity data; pruning the first artificial neural network model based on the optimal pruning rate to obtain a second artificial neural network model; and outputting the second artificial neural network mode.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, the inventive concept will be described in detail by explaining example embodiments of the inventive concept with reference to the attached drawings.

Figure 1:
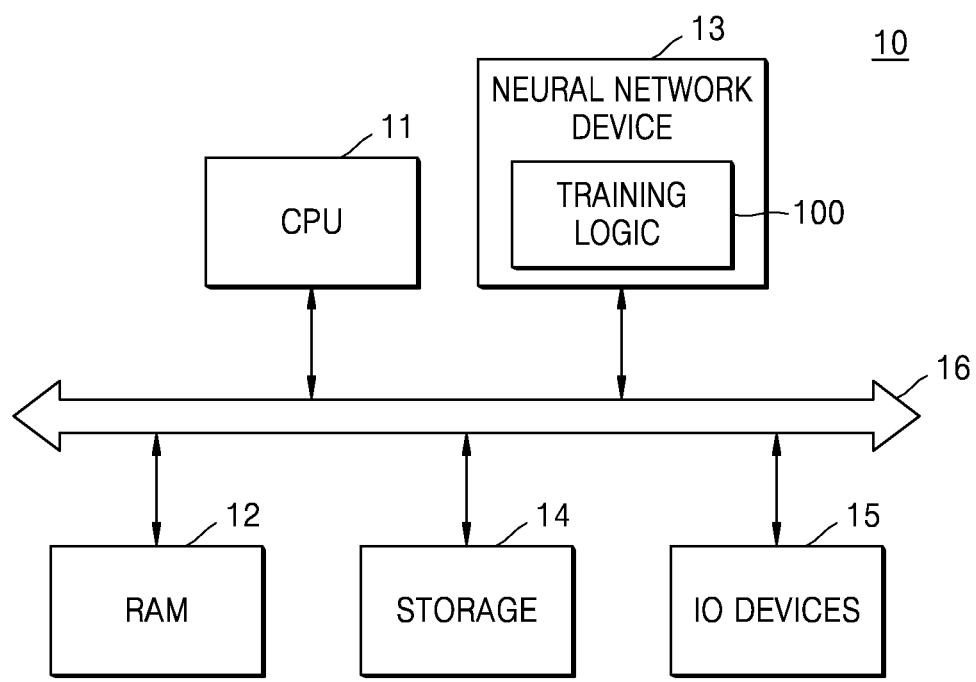
FIG. 1 is a view for describing a computing device, according to an example embodiment of the inventive concept.

FIG. 1 is a view for describing a computing device, according to an example embodiment of the inventive concept.

An electronic system 10 according to an example embodiment of the inventive concept may analyze input data based on an artificial neural network model in real time to extract effective information and control components of an electronic device including the electronic system 10 based on the extracted information. For example, the electronic system 10 may be applied to a smartphone, a mobile device, an image display device, a measurement device, a smart TV, a drone, a robot device such as an advanced drivers assistance system (ADAS), a medical apparatus, an Internet of Things (IoT) device, or the like or may be implemented in one of various electronic devices other than these. Hereinafter, an artificial neural network may be referred to as a neural network.

For example, the electronic system 10 of FIG. 1 may be an application processor. The electronic system 10 may be defined to include an artificial neural network model in that the electronic system 10 conducts an artificial neural network operation function.

Referring to FIG. 1, the electronic system 10 may include a central processing unit (CPU) 11, random access memory (RAM) 12, a neural network device 13, a storage 14, and one or more input/output (IO) devices 15. Storage 14 may comprise conventional memory of a computer, such as a hard drive (which may be a solid state drive, DRAM, NAND flash memory, etc.). Input/output devices 15 may comprise a conventional computer user interface and include convention input devices, such as a keyboard, mouse, trackpad, touchscreen, etc.

The neural network device 13 may include a training logic 100. The training logic 100 may train an artificial neural network model as will be described. In some embodiments, the training logic 100 may be included not only in the neural network device 13, but also in the CPU 11, the RAM 12, and the storage 14, or the like, or in various processors such as a digital signal processor (DSP). For convenience of description, the training logic 100 is described as being included in the neural network device 13.

Although not illustrated, the electronic system 10 may further include a sensor module, a security module, a power control device, or the like, and also other various types of operational units. For example, some or all of the components of the electronic system 10 (the CPU 11, the RAM 12, the neural network device 13, the storage 14, and the input/output device 15) may be embodied in a single semiconductor chip. For example, the electronic system 10 may be implemented as a system-on-chip (SoC). The components of the electronic system 10 may communicate with each other via a bus 16.

The CPU 11 controls an overall operation of the electronic system 10. The CPU 11 may include a single processor core (single-core) or a plurality of processor cores (multi-core). The CPU 11 may process or execute programs and/or data stored in the storage 14. For example, the CPU 11 may control a function of the neural network device 13 by executing programs stored in the storage 14.

The RAM 12 may temporarily store programs, data, and instructions. For example, programs and/or data stored in the storage 14 may be temporarily stored in the RAM 12 according to the control by the CPU 11 or booting code. The RAM 12 may include dynamic RAM (DRAM) or static RAM (SRAM).

The neural network device 13 conducts an operation based on an artificial neural network model and trains an artificial neural network model. According to an example embodiment, the training logic 100 may post-train an artificial neural network model on which iterative re-training has been performed. However, the inventive concept is not limited thereto, and according to another example embodiment, the training logic 100 may re-train an artificial neural network model. According to another example embodiment, the training logic 100 may perform both re-training and post-training.

According to an example embodiment of the inventive concept, the training logic 100 may perform post-training by using a data set including a relatively small amount of data, instead of a full data set, on an artificial neural network model on which pre-training such as re-training is performed.

The artificial neural network model may include various types of artificial neural network models such as a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, or a classification network, but is not limited thereto. An example of an artificial neural network will be described with reference to FIG. 2.

Figure 2:
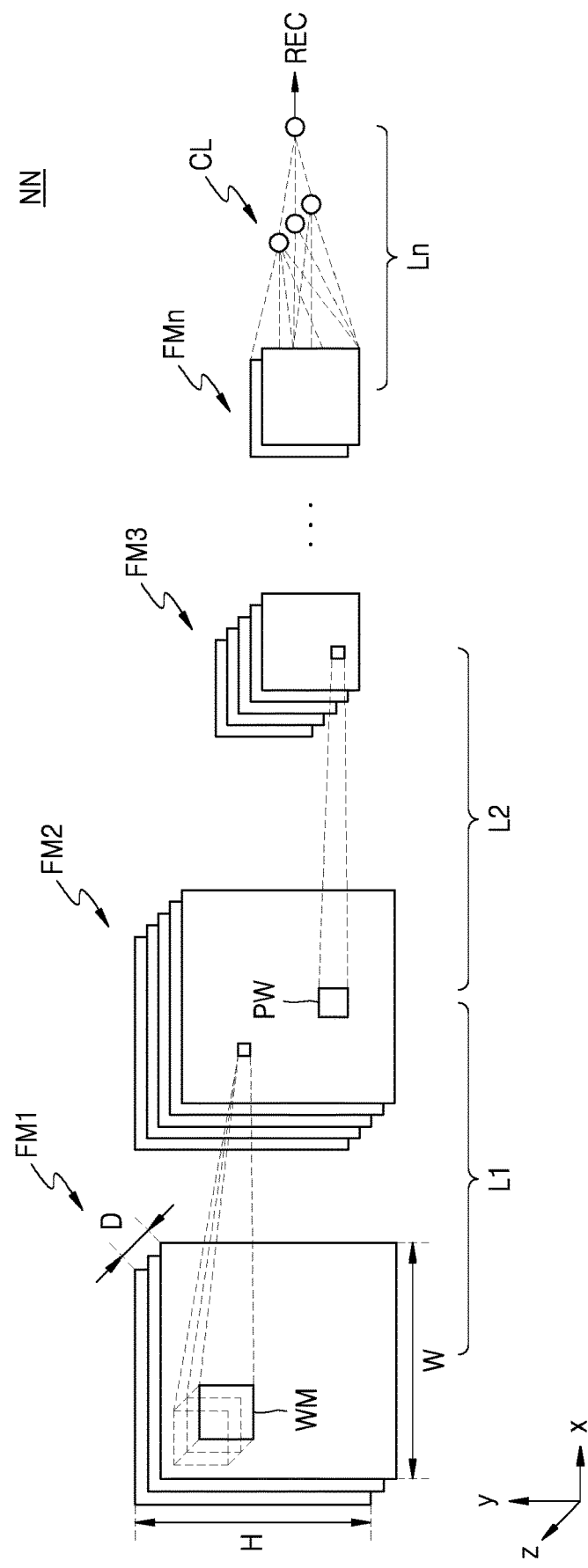
FIG. 2 illustrates an example of an artificial neural network.

FIG. 2 illustrates an example of an artificial neural network.

Referring to FIG. 2, an artificial neural network NN may include a plurality of layers L1 through Ln. Each of the plurality of layers L1 through Ln may be a linear layer or a non-linear layer, and according to an embodiment, at least one linear layer and at least one non-linear layer may be combined and referred to as a single layer. For example, a linear layer may include a convolution layer, a fully connected layer, or the like, and a non-linear layer may include a pooling layer and an activation layer.

For example, a first layer L1 may be a convolution layer, and a second layer L2 may be a pooling layer, and an nth layer Ln may be a fully connected layer as an output layer. The artificial neural network NN may further include an activation layer and a layer via which other types of operations are performed.

Each of the plurality of layers L1 through Ln may receive, as an input feature map, an input image frame or a feature map generated in a previous layer and may generate an output feature map by calculating the input feature map. For example, layer L2 may receive an input feature map from layer L1 and generate an output feature map by performing operations on the input feature map received from layer L1. The output of layer L2 may be provided to layer L3. A feature map refers to data in which various features of input data are expressed. Feature maps FM1 through FMn may have, for example, a two-dimensional matrix shape or a three-dimensional matrix shape. The feature maps FM1 through FMn may have a width W (also referred to as a column), a height H (also referred to as a row), and a depth D, which may respectively correspond to an x-axis, a y-axis, and a z-axis on coordinates. The depth D may be referred to as the number of channels.

The first layer L1 may convolute a first feature map FM1 with a weight map WM to generate a second feature map FM2. The weight map WM may filter the first feature map FM1 and may be referred to as a filter or a kernel. A depth of the weight map WM (e.g., the number of channels of the weight map WM) is equal to a depth of the first feature map FM1 (e.g., the number of channels of the first feature map), and corresponding channels of the weight map WM may be convoluted with channels of the first feature map FM1. The weight map WM is shifted on the first feature map FM1 as a sliding window. A shifted amount may be referred to as a "stride length" or a "stride." During each shift, each weight included in the weight map WM may be multiplied by or added to each feature value in an area overlapping the first feature map FM1. As the first feature map FM1 is convoluted with the weight map WM, a channel of the second feature map FM2 may be generated. While one weight map WM is illustrated in FIG. 2, practically, a plurality of weight maps may be convoluted with the first feature map FM1 and a plurality of channels of the second feature map FM2 may be generated. For example, the number of channels of the second feature map FM2 may correspond to the number of weight maps.

The second layer L2 may modify a spatial size of the second feature map FM2 by pooling to generate a third feature map FM3. Pooling may be referred to as sampling or down-sampling. For example, in the second layer L2, the second feature map FM2 may be sampled (or down-sampled) to reduce a spatial size of the second feature map FM2 in the x and y directions. A two-dimensional pooling window PW may be shifted on the second feature map FM2 in units of a size of the pooling window PW, and a maximum feature value of an area overlapping the pooling window PW (or an average value of feature values) may be selected. For example, the two-dimensional pooling window PW may be shifted in the x and y directions in increments of the width and height, respectively, of the pooling window PW. Accordingly, a third feature map FM3 having a spatial size changed from that of the second feature map FM2 may be generated. The number of channels of the third feature map FM3 is equal to the number of channels of the second feature map FM2. For example, a depth of the third feature map FM3 may be the same as the depth of the second feature map FM2.

According to an example embodiment, the second layer L2 is not limited to a pooling layer. For example, the second layer L2 may be a pooling layer or the second layer L2 may be a convolution layer that is similar to the first layer L1. The second layer L2 may convolute the second feature map FM2 with a weight map to generate the third feature map FM3. In this case, a weight map, with which a convolution operation is performed in the second layer L2, may be different from the weight map WM, with which a convolution operation in the first layer L1 is performed.

After passing the plurality of layers including the first layer L1 and the second layer L2, an Nth feature map FMn may be generated in an Nth layer. The Nth feature map FMn may be input to a reconstruction layer CL located at a back end of the artificial neural network NN, from which output data is output. The reconstruction layer CL may generate an output image REC by convoluting the Nth feature map FMn with a weight map. The reconstruction layer CL may include a convolution layer or may be implemented using other types of layers that may reconstruct an image from a feature map according to example embodiments.

Referring to FIGS. 1 and 2, the training logic 100 may train an artificial neural network model such that the artificial neural network model may have an optimal pruning rate with respect to input data. For example, an optimal pruning rate of an artificial neural network model regarding image analysis may be a first value, and an optimal pruning rate of an artificial neural network model regarding voice analysis may be a second value, where the second value is different from the first value.

The training logic 100 may calculate first sensitivity data with respect to the entire artificial neural network model and calculate second sensitivity data of each of the plurality of layers L1 through Ln.

Hereinafter, sensitivity data may include a degree that data output according to an operation of an artificial neural network is affected as a certain layer is pruned or the entire artificial neural network model is pruned. Sensitivity data may include sensitivity values that vary, for example, according to a pruning rate. A pruning rate may include a rate at which components corresponding to neurons and/or synapses included in each of the plurality of layers L1 through Ln are removed. For example, first sensitivity data may indicate a degree of the decline in accuracy of a result output by an artificial neural network model according to an increase in neurons and/or synapses removed from the entire artificial neural network model. As another example, second sensitivity data may indicate a degree of the decline in accuracy of a result output by an artificial neural network model according to an increase in neurons and/or synapses removed from a certain layer.

The training logic 100 may calculate target sensitivity based on the first sensitivity data. In this case, the training logic 100 may calculate target sensitivity by applying a received target pruning rate to the first sensitivity data. For example, target sensitivity may be a target value of a sensitivity that each of the plurality of layers L1 through Ln is to have, and the target sensitivity may have sensitivity data of an equal number to the number of the plurality of layers L1 through Ln. For example, the target sensitivity may include a target sensitivity value for each of the plurality of layers L1 through Ln.

The training logic 100 may calculate an optimal pruning rate of each of the plurality of layers L1 through Ln based on the second sensitivity data and the target sensitivity. For example, the neural network device 13 may calculate an inverse function of the second sensitivity data. The inverse function may represent a pruning rate that varies according to sensitivity. For example, the pruning rate data may be an inverse functional relationship with the second sensitivity data. The training logic 100 may calculate an optimal pruning rate of each of the plurality of layers L1 through Ln by inputting target sensitivity for each of the plurality of layers L1 through Ln to the inverse function.

The training logic 100 may generate an artificial neural network that is trained by pruning an artificial neural network model according to the calculated optimal pruning rate. For example, the neural network device 13 may update an artificial neural network model.

The storage 14 is a storage space for storing data, and may store an operating system (OS), various programs, and various data. According to an embodiment, the storage 14 may include at least one processor operating the training logic 100. For example, the storage 14 may be referred to as a processing in memory (PIM).

The storage 14 may be DRAM, but is not limited thereto. The storage 14 may include at least one of a volatile memory and a nonvolatile memory. A nonvolatile memory may include, for example, read-only memory (ROM), programmable ROM (PROM), electrically programmable ROM (EPROM), electrically erasable and programmable ROM (EEPROM), a flash memory, phase-change RAM (PRAM), magnetic RAM (MRAM), resistive RAM (RRAM), or ferroelectric RAM (FRAM). A volatile memory may include, for example, DRAM, SRAM, synchronous DRAM (SDRAM), PRAM, MRAM, RRAM, or FRAM. According to an embodiment, the storage 14 may include at least one of a Hard Disk Drive (HDD), a Solid State Drive (SSD), a compact flash (CF) card, a secure digital (SD) card, a micro secure digital (Micro-SD) card, a mini secure digital (Mini-SD) card, an extreme digital (xD) card or a memory stick.

The input/output device 15 may operate to output an operation result calculated by the electronic system 10 to the outside or the input/output device 15 may receive data.

Figure 3:
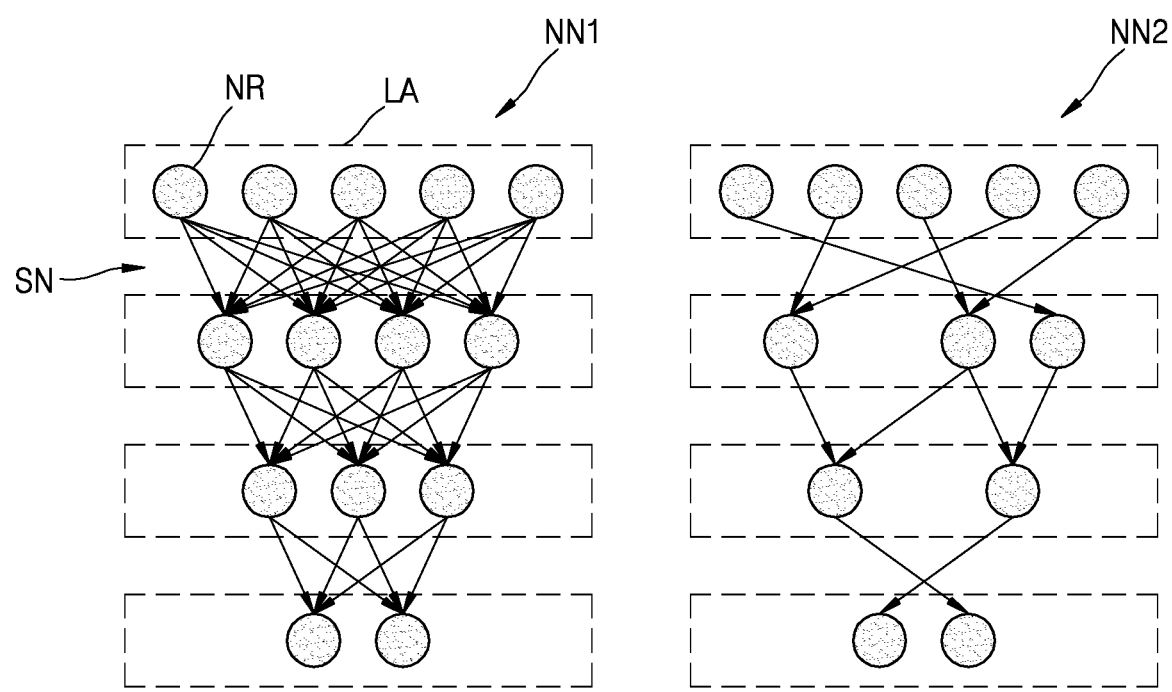
FIG. 3 is a view for describing a pruning method, according to an example embodiment of the inventive concept and a comparative example.

FIG. 3 is a view for describing a pruning method according to an embodiment of the inventive concept and a comparative example.

A first artificial neural network model NN1 may be an artificial neural network model before being pruned, and a second artificial neural network model NN2 may be a pruned artificial neural network. The first and second artificial neural network models NN1 and NN2 may include a plurality of layers LAs, and each layer LA may include at least one neuron NR. A result of an operation output from a first neuron NR may be transferred to a second neuron NR via a synapse SN. In artificial neural network model NN2, the number of neurons NR in a layer LA may be less than the number of neurons NR in the same layer LA of artificial neural network model NN1. In addition, in artificial neural network model NN2, the number of synapses SN between layers LAs may be less than the number of synapses SN between the same layers LAs of artificial neural network model NN1. The number of layers LAs in the artificial neural network models NN1 and NN2 may remain the same.

According to a comparative example, a neuron NR and a synapse SN may be pruned based on respective weights of the neuron NR and the synapse SN. It is based on the assumption that the total network performance hardly degrades when a neuron NR and a synapse SN, which have a relatively low weight value, are pruned. However, although small, a weight value may greatly affect the accuracy of the entire artificial neural network. Thus, according to an example embodiment of the inventive concept, the importance of a plurality of layers LAs are calculated based on sensitivity and a pruning rate and the decrease in accuracy may be minimized. In addition, according to an example embodiment of the inventive concept, to prevent degradation of the performance of the entire artificial neural network, an optimal pruning rate may be allocated to a plurality of layers LAs based on sensitivity and a pruning rate of the entire artificial neural network.

Figure 4:
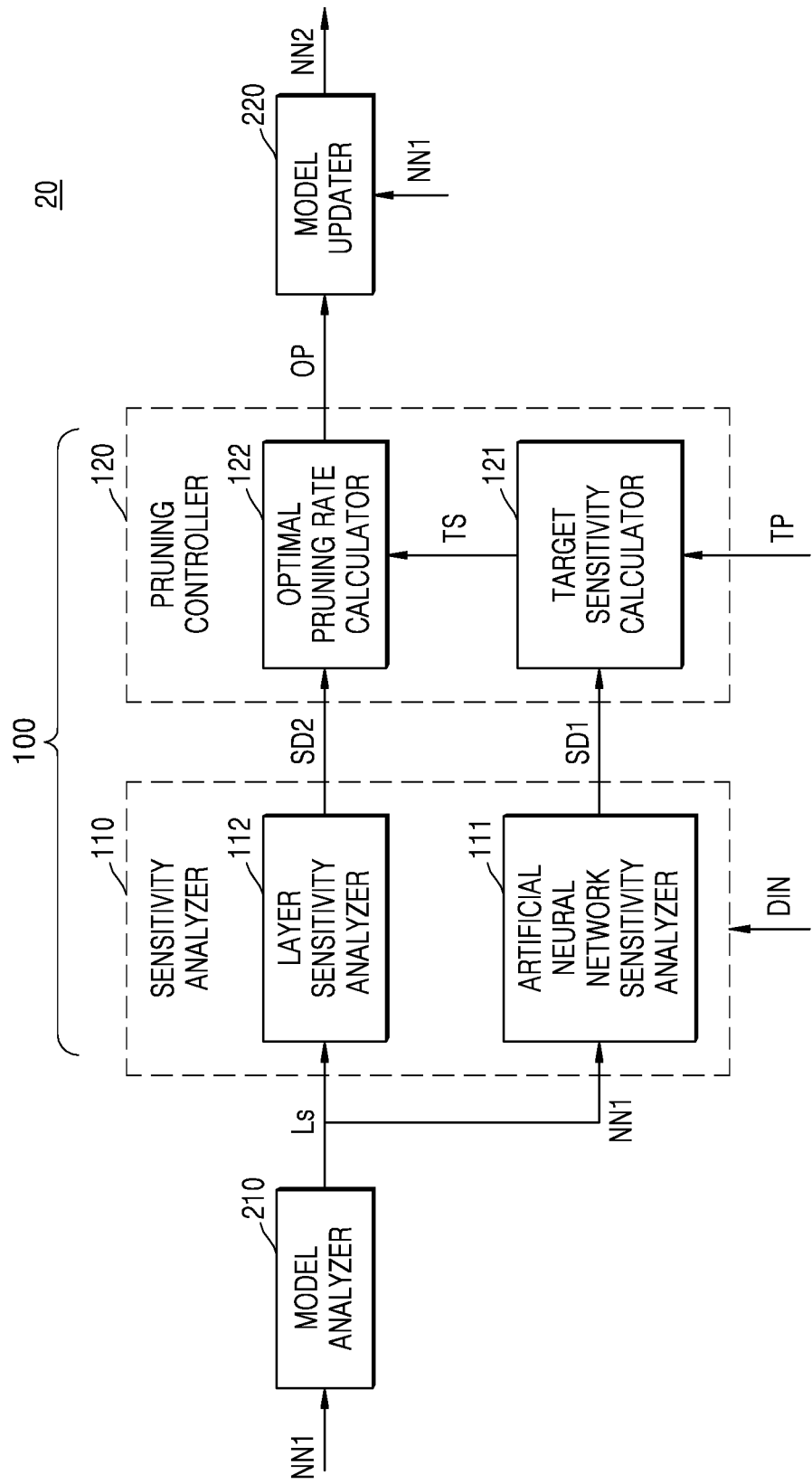
FIG. 4 is a block diagram of a computing device, according to an example embodiment of the inventive concept.

FIG. 4 is a block diagram of a computing device 20 according to an example embodiment of the inventive concept.

Referring to FIG. 4, the computing device 20 may include training logic 100, a model analyzer 210, and a model updater 220. The training logic 100 of FIG. 4 may be the same as that described with respect to FIG. 1 and may constitute a portion of the electronic system 10 of FIG. 1 The training logic 100 may include a sensitivity analyzer 110 and a pruning controller 120. In addition, the sensitivity analyzer 110 may include an artificial neural network sensitivity analyzer 111 and a layer sensitivity analyzer 112, and the pruning controller 120 may include a target sensitivity calculator 121 and an optimal pruning rate calculator 122.

The computing device 20 may be a computer (or several interconnected computers) and can include, for example, one or more processors configured by software, such as a CPU (central processing unit), GPU (graphics processor), controller, etc., and include the training logic 100, the model analyzer 210, the model updater 220, and the like, forming various functional modules of the computer. The computer may be a general purpose computer or may be dedicated hardware or firmware (e.g., an electronic or optical circuit, such as application-specific hardware, such as, for example, a digital signal processor (DSP) or a field-programmable gate array (FPGA)). A computer may be configured from several interconnected computers. Each functional module (or unit) described herein may comprise a separate computer, or some or all of the functional module (or unit) may be comprised of and share the hardware of the same computer. Connections and interactions between the units described herein may be hardwired and/or in the form of data (e.g., as data stored in and retrieved from memory of the computer, such as a register, buffer, cache, storage drive, etc., such as part of an application programming interface (API)). The functional modules (or units) of computing device 20 (e.g., training logic 100, model analyzer 210, and model updater 220) may each correspond to a separate segment or segments of software (e.g., a subroutine) which configure the computer of the computing device 20, and/or may correspond to segment(s) of software that also correspond to one or more other functional modules (or units) described herein (e.g., the functional modules (or units) may share certain segment(s) of software or be embodied by the same segment(s) of software). As is understood, "software" refers to prescribed rules to operate a computer, such as code or script.

The model analyzer 210 may receive the first artificial neural network model NN1, split the first artificial neural network model NN1 into a plurality of layers Ls, and output information about the plurality of layers Ls. In addition, the model analyzer 210 may output information about the entire first artificial neural network model NN1. For example, the model analyzer 210 may replace, merge, and/or split a data structure of the first artificial neural network model NN1 to output information about the plurality of layers Ls of the first artificial neural network model NN1. In some example embodiments, the model analyzer 210 may organize the nodes of the first artificial neural network model NN1 into a plurality of layers Ls, and transmit information defining each of the plurality of layers Ls to the sensitivity analyzer 110.

The sensitivity analyzer 110 may output first sensitivity data SD1 based on the first artificial neural network model NN1 and output second sensitivity data SD2 based on the plurality of layers Ls. The sensitivity analyzer 110 may receive input data DIN, which is needed in a test, and may output first and second sensitivity data SD1 and SD2 including sensitivity values that vary according to a pruning rate, by applying various pruning rates to the first artificial neural network model NN1 and the plurality of layers Ls. For example, the artificial neural network sensitivity analyzer 111 may receive the first artificial neural network model NN1 that is output from the model analyzer 210, may calculate the first sensitivity data SD1 based on the received first artificial neural network model NN1 and the input data DIN, and may output the calculated first sensitivity data SD1. In addition, the layer sensitivity analyzer 112 may receive the information about the plurality of layers Ls that is output from the model analyzer 210, may calculate the second sensitivity data SD2 based on the received plurality of layers Ls and the input data DIN, and may output the calculated second sensitivity data SD2.

According to an example embodiment of the inventive concept, to reduce the amount of operations, the sensitivity analyzer 110 may interpolate the sensitivity values to output first and second sensitivity data SD1 and SD2. For example, the sensitivity analyzer 110 may obtain pruning rates in units of, for example, 0.1, from among pruning rates having values from 0 to 1. The sensitivity analyzer 110 may apply pruning rates having a predetermined unit interval such as 0, 0.1, . . . , 0.9, 1, to the first artificial neural network model NN1 and the plurality of layers Ls. The first artificial neural network model NN1 and the plurality of layers Ls may be pruned to correspond to the applied pruning rates. The first artificial neural network model NN1 and the plurality of layers Ls may have lower data accuracy due to neurons NR or synapses SN that are removed as a pruning rate increases. This may indicate that output data is reacting sensitively due to the removed neurons NR or synapses SN, and the sensitivity may increase as the pruning rate increases. The sensitivity analyzer 110 may obtain sensitivity values of increased sensitivity as the pruning rate increases, and may output first sensitivity data SD1 and second sensitivity data SD2 representing the sensitivity values.

The pruning controller 120 may determine and output an optimal pruning rate OP based on the first sensitivity data SD1 and the second sensitivity data SD2. The pruning controller 120 may obtain a target sensitivity TS based on the first sensitivity data SD1 and a received target pruning rate TP. The pruning controller 120 may apply the target sensitivity TS to sensitivity of each of the plurality of layers Ls included in the second sensitivity data SD2. The pruning controller 120 may output an optimal pruning rate OP, which corresponds to the target sensitivity TS and which each of the plurality of layers Ls may have.

According to an embodiment of the inventive concept, the target sensitivity calculator 121 may receive the first sensitivity data SD1 output from the artificial neural network sensitivity analyzer 111 and the target pruning rate TP, and may output the target sensitivity TS. For example, the target sensitivity calculator 121 may calculate a target sensitivity TS corresponding to the target pruning rate TP from the first sensitivity data SD1. The target pruning rate TP may denote, for example, a degree that the entire first artificial neural network model NN1 may be pruned. For example, the target pruning rate TP may vary according to a request from the electronic system 10. The optimal pruning rate calculator 122 may receive the target sensitivity TS output from the target sensitivity calculator 121 and the second sensitivity data SD2 output from the layer sensitivity analyzer 112. The optimal pruning rate calculator 122 may calculate an optimal pruning rate OP of each of the plurality of layers Ls according to the target sensitivity TS that the first artificial neural network model NN1 is to have. For example, the optimal pruning rate calculator 122 may calculate an optimal pruning rate OP of each of the plurality of layers Ls based on the target sensitivity TS output from the target sensitivity calculator 121. An optimal pruning rate OP may vary, for example, among the plurality of layers Ls, or may vary among only at least some of the plurality of layers Ls. For example, an optimal pruning rate OP may include a plurality of pruning rate values. Meanwhile, the optimal pruning rate calculator 122 may output allocation information whereby an optimal pruning rate OP is allocated to each of the plurality of layers Ls.

According to an example embodiment of the inventive concept, the model updater 220 may receive the optimal pruning rate OP output from the optimal pruning rate calculator 122 and the first artificial neural network model NN1. The model updater 220 may generate and output a second artificial neural network model NN2 updated by applying the optimal pruning rate OP to the first artificial neural network model NN1. For example, the model updater 220 may prune neurons NR and/or synapses SN of one or more of the plurality of layers Ls based on an optimal pruning rate OP. In this case, different numbers of neurons NR and synapses SN may be pruned based on different pruning rates for each of the plurality of layers Ls.

Figure 5:
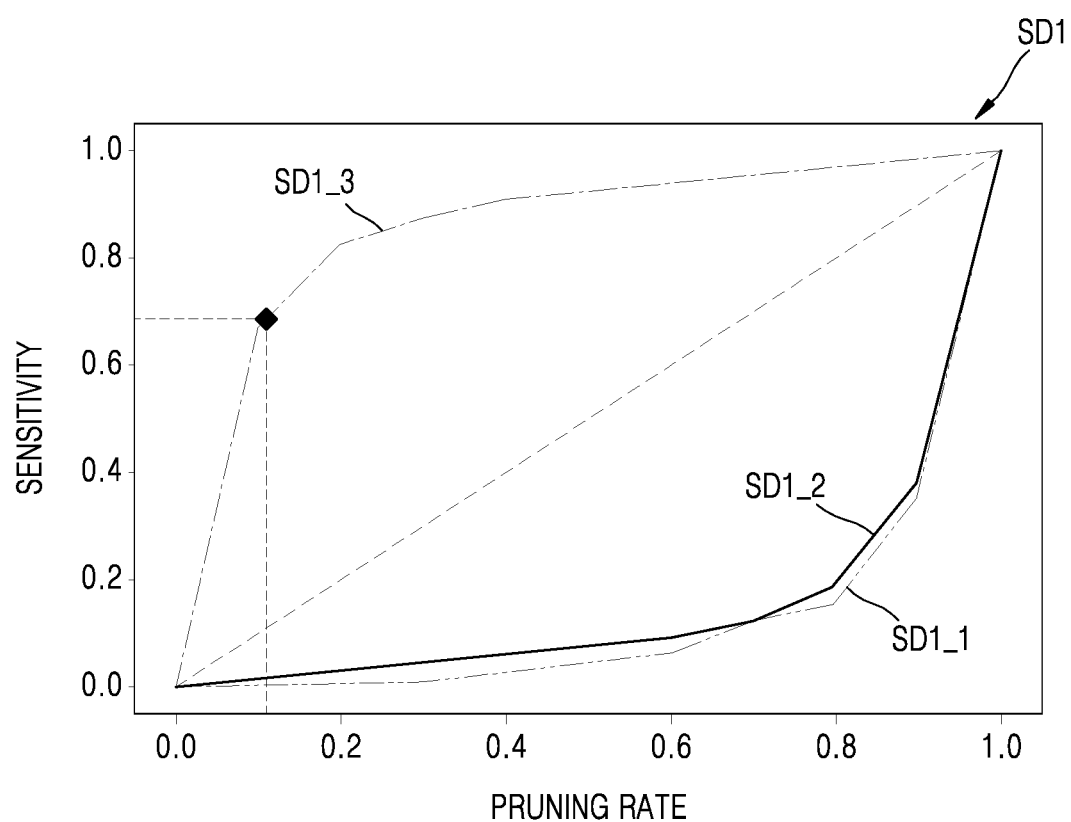
FIG. 5 is a graph showing first sensitivity data of the entire artificial neural network model, according to an example embodiment of the inventive concept.

FIG. 5 is a graph showing first sensitivity data of the entire artificial neural network model according to an example embodiment of the inventive concept.

Referring to FIG. 5, the horizontal axis denotes a pruning rate; when a pruning rate is 0, pruning is not performed, and when a pruning rate is 1, all neurons NR and synapses SN are removed. The vertical axis denotes sensitivity and indicates a degree that output data of an artificial neural network model reacts inaccurately according to a pruning rate. For example, the sensitivity may reflect a degree to which the output data becomes inaccurate in response to different pruning rates.

Referring to FIG. 5, first sensitivity data SD1 may include a variation in sensitivity of the first artificial neural network model NN1 included in the training logic 100 according to a change in a pruning rate. A first sensitivity curve SD1_1 indicates an actual change in sensitivity of the first artificial neural network model NN1, a second sensitivity curve SD1_2 indicates interpolation of a change in sensitivity of the first artificial neural network model NN1, and a third sensitivity curve SD1_3 indicates data obtained by symmetrically displacing the second sensitivity curve SD1_2 about y=x.

Referring to FIGS. 4 and 5, the artificial neural network sensitivity analyzer 111 may obtain output data by performing, on input data DIN, an operation according to the first artificial neural network model NN1, and may calculate sensitivity by analyzing a change in the output data or analyzing accuracy thereof as a pruning rate varies. In this case, the artificial neural network sensitivity analyzer 111 may split a pruning rate from 0 to 1 into unit intervals, apply a certain number of the pruning rates to the first artificial neural network model NN1, and obtain sensitivity values corresponding to the applied pruning rates. The artificial neural network sensitivity analyzer 111 may interpolate the obtained sensitivity values to obtain the second sensitivity curve SD1_2 and the third sensitivity curve SD1_3 that is symmetrically displaced about y=x. Next, the target sensitivity calculator 121 may substitute the received target pruning rate TP for the third sensitivity curve SD1_3 to obtain the target sensitivity TS.

Figure 6:
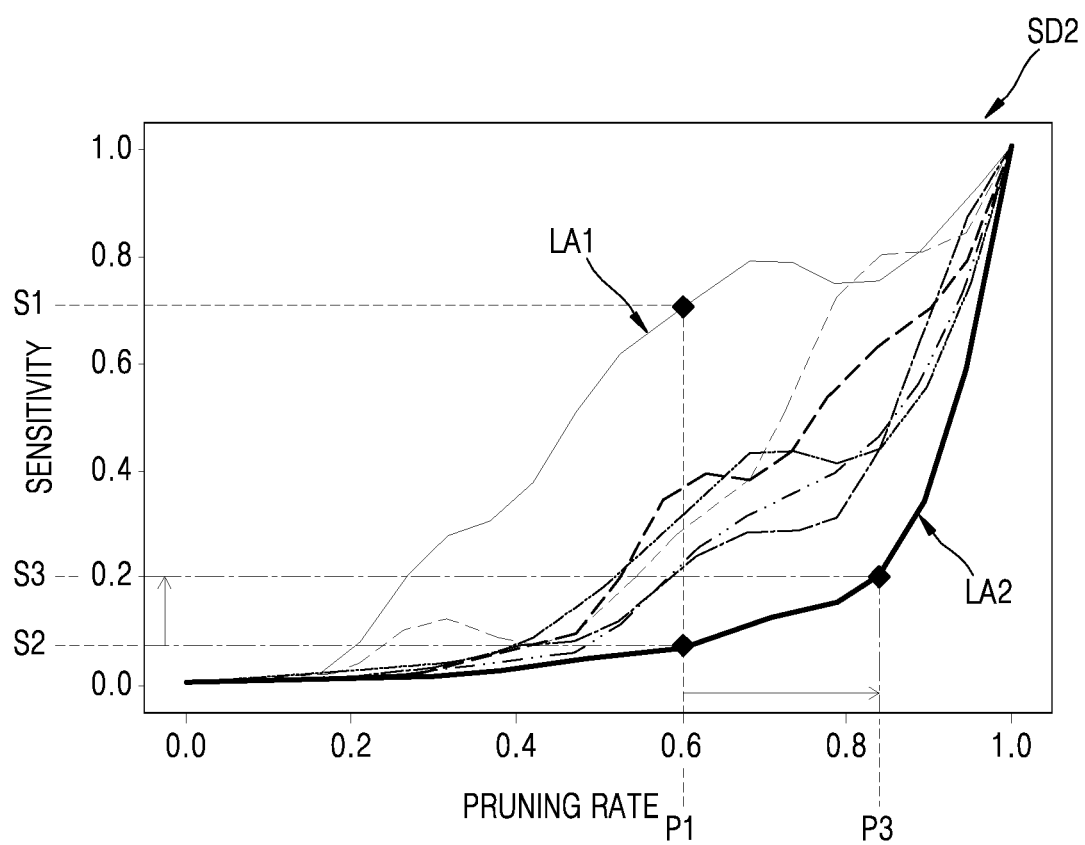
FIG. 6 is a graph showing second sensitivity data including a sensitivity curve of each of a plurality of layers, according to an example embodiment of the inventive concept.
Figure 7:
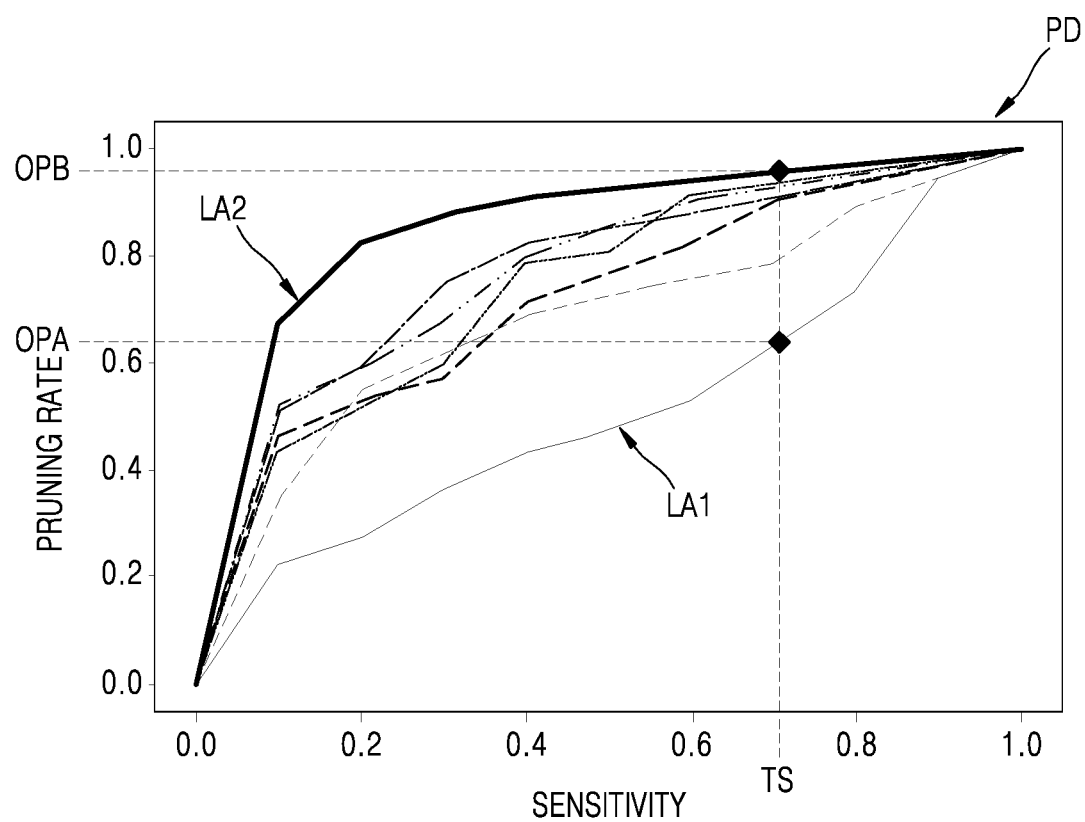
FIG. 7 is a graph showing third sensitivity data based on second sensitivity data, according to an example embodiment of the inventive concept.

FIG. 6 is a graph showing second sensitivity data including a sensitivity curve of each of a plurality of layers Ls according to an example embodiment of the inventive concept, and FIG. 7 is a graph showing third sensitivity data based on second sensitivity data according to an example embodiment of the inventive concept.

Referring to FIG. 6, sensitivity values of a plurality of layers Ls included in the first artificial neural network model NN1 may vary according to a change in a pruning rate. For example, in a range of a pruning rate from about 0.2 to about 0.8, sensitivity of a first layer LA1 may increase abruptly (e.g., have a greater slope) and that of a second layer LA2 may increase gently (e.g., have a smaller slope). When pruning the first artificial neural network model NN1 by using a first pruning value P1, the first layer LA1 may have a first sensitivity value S1, which is relatively high, but the second layer LA2 may have a second sensitivity value S2, which is relatively low.

According to an example embodiment of the inventive concept, preserving the first pruning rate value P1 and the first sensitivity value S1 that are set to the first layer LA1 and increasing the first pruning rate value P1 set to the second layer LA2 may mitigate a decrease in accuracy (or an increase in sensitivity) relative to the increase in the pruning rate. For example, a pruning rate value of the second layer LA2 may be increased to a third pruning rate value P3. When the pruning rate value of the second layer LA2 is a third pruning rate value P3, the second layer LA2 may have a sensitivity value S3, which is greater than sensitivity value S2 and smaller than sensitivity value S1.

Referring to FIGS. 6 and 7, the optimal pruning rate calculator 122 may interpolate the second sensitivity data SD2 and calculate pruning rate data PD obtained by performing a reverse functional operation. In this case, the optimal pruning rate calculator 122 may calculate sensitivity values of each certain section of a pruning rate and interpolate the calculated sensitivity values.

The optimal pruning rate calculator 122 may receive target sensitivity TS and apply the target sensitivity TS to the pruning rate data PD to calculate first and second optimal pruning rates OPA and OPB of the plurality of first and second layers LA1 and LA2, respectively. For example, the first layer LA1 has a relatively high sensitivity in a certain pruning rate range, and thus, a first optimal pruning rate OPA is allocated thereto. The second layer LA2 has a relatively lower sensitivity in a certain pruning rate range, and thus, a second optimal pruning rate OPB that is higher than the first optimal pruning rate OPA is allocated thereto.

Figure 8:
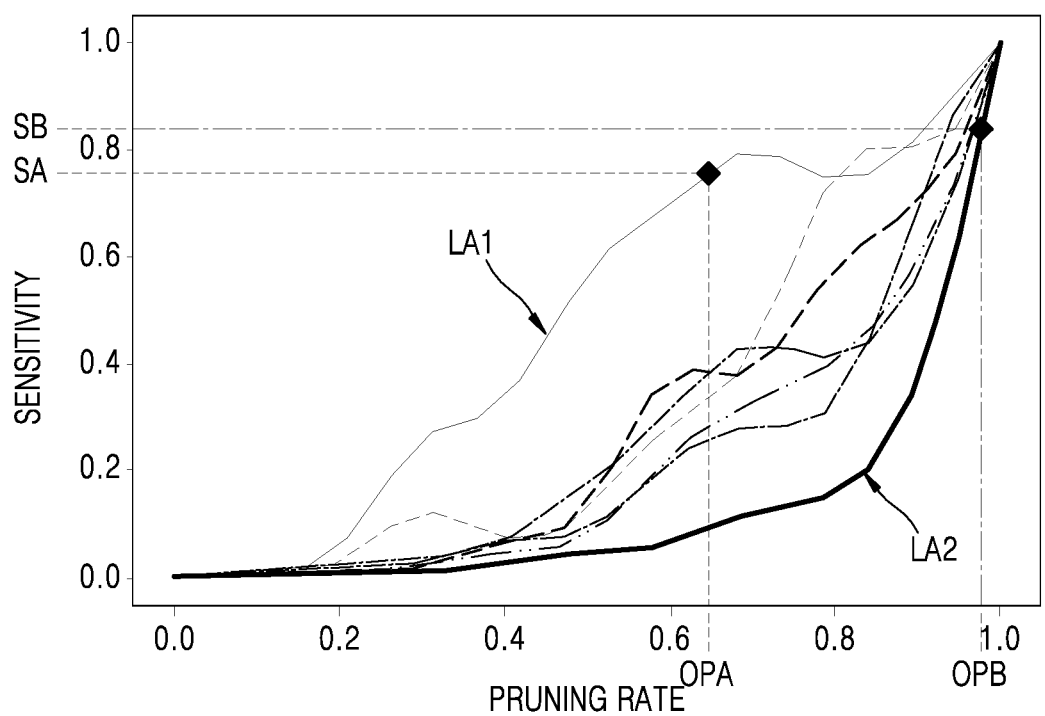
FIG. 8 is a graph showing sensitivity values of each of pruning rates of a plurality of layers, according to an example embodiment of the inventive concept.

FIG. 8 is a graph showing sensitivity values of each of pruning rates of a plurality of layers Ls according to an example embodiment of the inventive concept.

As described above with reference to FIG. 7, the optimal pruning rate calculator 122 may calculate the first and second optimal pruning rates OPA and OPB. The model updater 220 may prune a plurality of layers Ls of the first artificial neural network model NN1 based on the first and second optimal pruning rates OPA and OPB, and may output the second artificial neural network model NN2, which is updated after the pruning. The second artificial neural network model NN2, which is updated, may include a first layer LA1 and a second layer LA2. The first layer LA1 may be pruned according to the first optimal pruning rate OPA to have a first sensitivity SA. The second layer LA2 may be pruned according to the second optimal pruning rate OPB to have a second sensitivity SB. The first sensitivity SA and the second sensitivity SB may be similar to the target sensitivity TS described above. As described above with reference to FIG. 6, as a pruning rate value of the second layer LA2 having a relatively low sensitivity is set to be higher than a pruning rate value of the first layer LA1, the second layer LA2 having a relatively low sensitivity may be pruned by a greater degree. Accordingly, the computing device 20 may efficiently prune the first artificial neural network model NN1.

Figure 9:
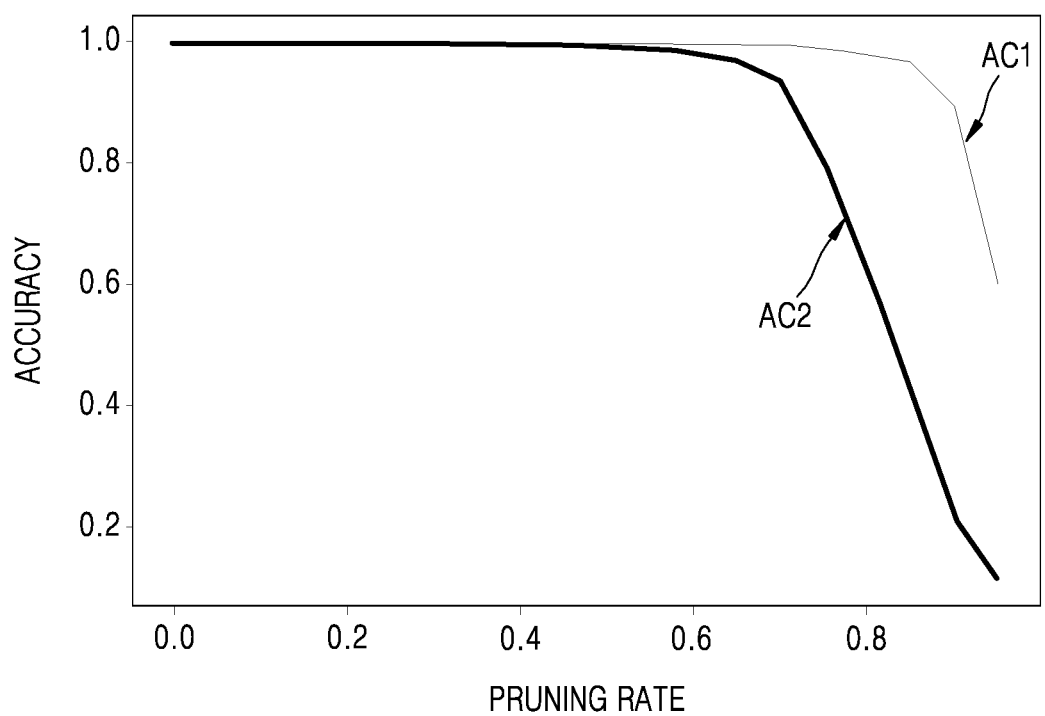
FIG. 9 is a graph showing accuracy of an artificial neural network model with respect to a pruning rate, according to an example embodiment of the inventive concept and a comparative example.

FIG. 9 is a graph showing accuracy of an artificial neural network model with respect to a pruning rate according to an embodiment of the inventive concept and a comparative example. The present embodiment will be described based on the reference numerals of the drawings described above.

Referring to FIG. 9, the horizontal axis denotes a pruning rate for pruning an artificial neural network model, and the vertical axis denotes accuracy of data output, based on input data, by the artificial neural network model.

Referring to FIG. 9, the first artificial neural network model NN1 pruned at an optimal pruning rate OP according to the above-described embodiments may have a relatively small decrease in accuracy AC1 despite the increase in a pruning rate. This is because, for example, a layer (e.g., layer LA1 of FIG. 8) that greatly affects sensitivity of the first artificial neural network model NN1 in a certain range of a pruning rate (from about 0.5 to about 1) is pruned at a relatively low pruning rate (for example, pruning rate OPA of FIG. 8). In addition, this is also because a layer (e.g., layer LA2 of FIG. 8) that infrequently affects sensitivity of the first artificial neural network model NN1 in a certain range of a pruning rate is pruned at a relatively higher pruning rate (e.g., pruning rate OPB of FIG. 8).

On the other hand, an electronic device according to the comparative example may perform pruning in an order from a lowest weight value included in the layers. When pruning a layer L, synapse SN, or neuron NR which simply has a low weight value, data output accuracy of the entire artificial neural network model may not be considered. Thus, accuracy AC2 with respect to a pruning rate according to the comparative example may be lower than that of the embodiment of the inventive concept in which sensitivity with respect to the pruning rate of the entire artificial neural network model and sensitivity with respect to a pruning rate of each layer are considered.

Figure 10:
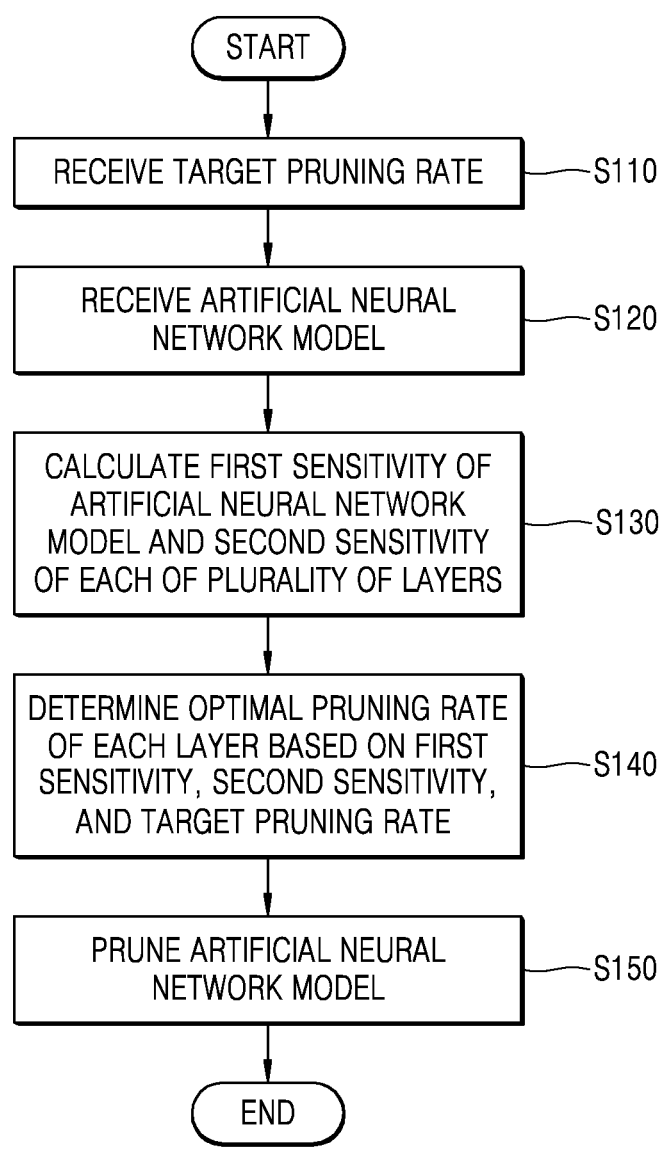
FIG. 10 is a flowchart of a pruning operation of an artificial neural network model, according to an example embodiment of the inventive concept.

FIG. 10 is a flowchart of a pruning operation of an artificial neural network model according to an embodiment of the inventive concept.

According to an embodiment of the inventive concept, the computing device 20 may receive a target pruning rate TP (S110). The target pruning rate TP may be a value set by a user and may indicate a degree that the entire artificial neural network model may be pruned. For example, the target pruning rate TP may be input to the computing device 20 via an input/output device (not shown) of the computing device 20.

The computing device 20 may receive the first artificial neural network model NN1 (S120). The first artificial neural network model NN1 may be a model which is an object to be pruned and may include a plurality of layers Ls.

The computing device 20 may calculate a first sensitivity of the entire first artificial neural network model NN1 and a second sensitivity of each of a plurality of layers Ls included in the first artificial neural network model NN1 (S130). Here, the first sensitivity and the second sensitivity may include a degree of inaccuracy of a result output by the first artificial neural network model NN1 according to input data. For example, the first sensitivity may include a plurality of sensitivity values of the first artificial neural network model NN1 pruned using a plurality of pruning rate values. For example, the second sensitivity may include sensitivity values about output data of the first artificial neural network model NN1 according to a plurality of layers Ls, each pruned at rates different from each other.

The computing device 20 may determine an optimal pruning rate OP based on a first sensitivity obtained by performing a pruning operation on the entire first artificial neural network model NN1 and a second sensitivity obtained by performing a pruning operation on each of the plurality of layers Ls and the target pruning rate TP (S140). For example, the computing device 20 may calculate an optimal pruning rate OP by considering both the first sensitivity of the entire first artificial neural network model NN1 according to a pruning rate and the second sensitivity of each of the plurality of layers Ls according to a pruning rate.

The computing device 20 may prune an artificial neural network model (S150). For example, the computing device 20 may prune an artificial neural network model by pruning a plurality of layers Ls at different optimal pruning rates OP from each other. The second artificial neural network model NN2 that is updated by pruning may be more optimized for input data than the first artificial neural network model NN1, which is before being pruned.

Figure 11:
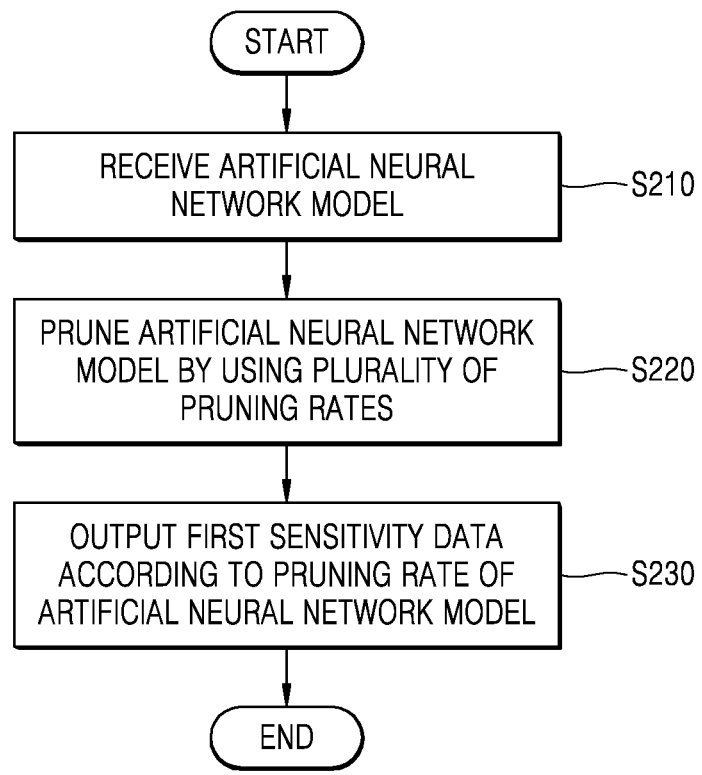
FIG. 11 is a flowchart of a method of obtaining first sensitivity data, according to an example embodiment of the inventive concept.

FIG. 11 is a flowchart of a method of obtaining first sensitivity data, according to an example embodiment of the inventive concept. The present embodiment will be described based on the reference numerals of the drawings described above.

According to an embodiment of the inventive concept, the computing device 20 may receive a first artificial neural network model NN1 (S210).

The computing device 20 may prune the first artificial neural network model NN1 by using a plurality of pruning rate values (S220). For example, the sensitivity analyzer 110 may split a pruning rate into unit intervals, obtain sensitivity values by analyzing a variation of output data of each unit interval, and interpolate sensitivity values.

The computing device 20 may output first sensitivity data SD1 according to a pruning rate of the first artificial neural network model NN1 (S230). For example, the sensitivity analyzer 110 may apply received input data DIN to the first artificial neural network model NN1. The sensitivity analyzer 110 may analyze a variation in output data while increasing a pruning rate from 0 to 1 in unit intervals. The greater the variation, the lower the accuracy and the higher the sensitivity may be. The sensitivity analyzer 110 may digitize sensitivity based on the variation of output data. For example, when a pruning rate is 0.5, data output by the first artificial neural network model NN1 may differ from output data output at a pruning rate of 0, by a certain value. The sensitivity analyzer 110 may digitize the difference and output first sensitivity data SD1 including sensitivity values from 0 to 1.

Figure 12:
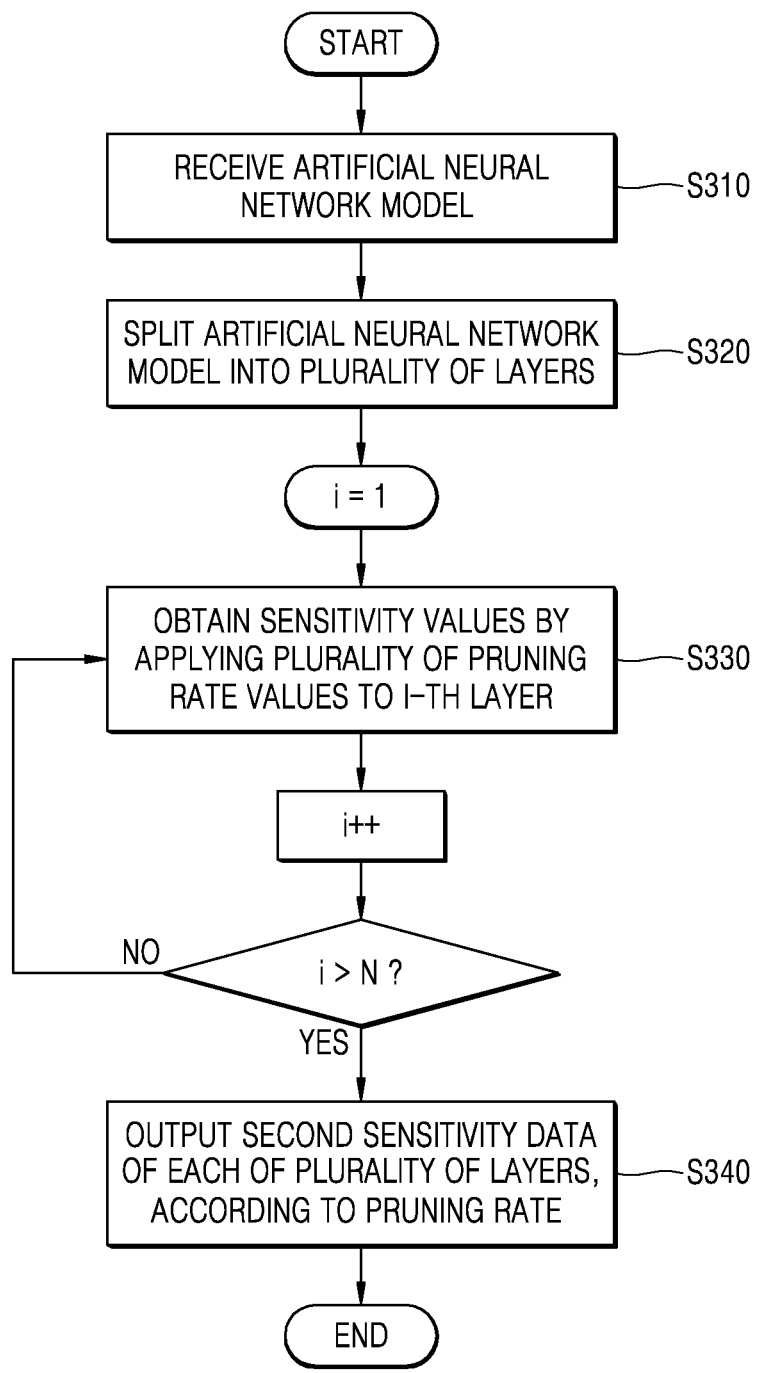
FIG. 12 is a flowchart of a method of obtaining second sensitivity data, according to an example embodiment of the inventive concept.

FIG. 12 is a flowchart of a method of obtaining second sensitivity data, according to an example embodiment of the inventive concept. The present embodiment will be described based on the reference numerals of the drawings described above.

According to an embodiment of the inventive concept, the computing device 20 may receive a first artificial neural network model NN1 (S310).

The computing device 20 may split the first artificial neural network model NN1 into a plurality of layers Ls (S320). For example, the model analyzer 210 may analyze a plurality of layers Ls included in the first artificial neural network model NN1 by using various well-known methods. In some embodiments, the model analyzer 210 may transmit each of the analyzed plurality of layers Ls to the training logic 100. In other embodiments, the training logic 100 may transmit only information about the plurality of layers Ls without splitting the first artificial neural network model NN1.

The computing device 20 may determine sensitivity by applying a plurality of pruning rates to an i-th layer (S330). For example, operation S330 may be repeatedly performed on all N layers included in the first artificial neural network model NN1 or on at least some layers in another example. For example, the sensitivity analyzer 110 may split a pruning rate into unit intervals. The sensitivity analyzer 110 may respectively apply the pruning rates split into unit intervals to the layers. Next, the sensitivity analyzer 110 may apply received input data DIN to the first artificial neural network model NN1. The sensitivity analyzer 110 may analyze a variation in output data according to the pruning rates respectively allocated to the layers while increasing a pruning rate from 0 to 1. The greater the variation, the lower the accuracy may be and the higher the sensitivity may be. The sensitivity analyzer 110 may obtain sensitivity values based on the variation of output data.

The computing device 20 may output second sensitivity data SD2 according to the respective pruning rates of the plurality of layers Ls based on the obtained sensitivity values (S340). For example, when the first layer LA1 is pruned using a plurality of pruning rates, an artificial neural network model in which the first layer LA1 is pruned may output data and include sensitivity values according to the output data. The same applies to the second layer LA2.

According to an embodiment of the inventive concept, pruning of a layer, which has a small weight value but has great influence on the performance of an artificial neural network, may be prevented, thereby improving the accuracy of the artificial neural network.

According to an embodiment of the inventive concept, the accuracy or sensitivity of an entire artificial neural network may be first analyzed and then pruning may be performed thereon using a post-training method, and thus, an artificial neural network may be quickly trained using a smaller amount of data than a re-training method of the related art.

Figure 13:
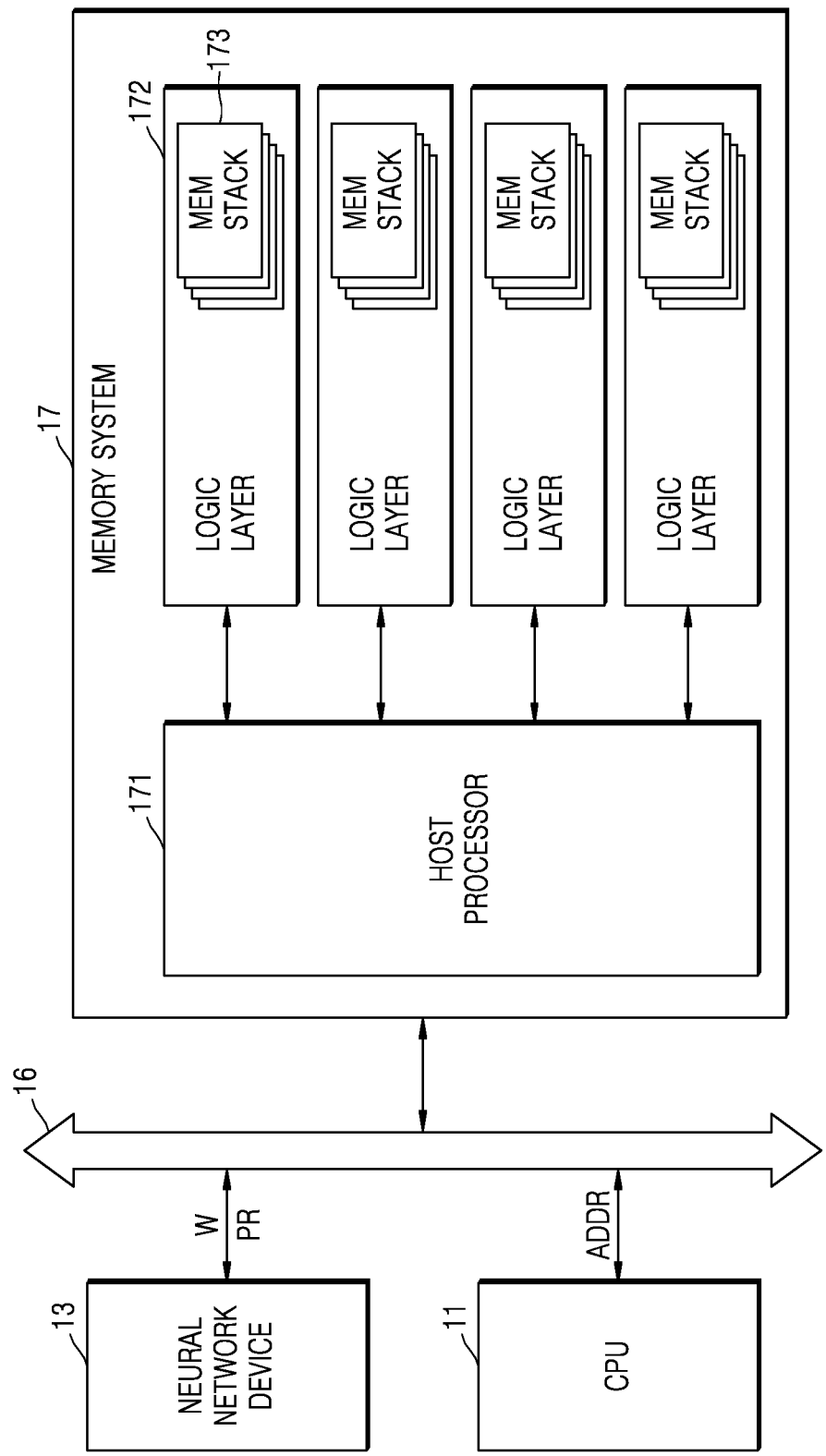
FIG. 13 is a view for describing a memory system, according to an example embodiment of the inventive concept.

FIG. 13 is a view for describing a memory system according to an example embodiment of the inventive concept. The present embodiment will be described based on the reference numerals of the drawings described above.

Referring to FIG. 13, an electronic system may include a CPU 11, a neural network device 13, a memory system 17, and a bus 16, which performs communication in the electronic system.

According to an embodiment of the inventive concept, when changing a pruning rate PR of each of a plurality of layers Ls to an optimal pruning rate OP, a value of a weight W included in the plurality of layers Ls may not be uniform. Accordingly, the electronic system 30 may update (or adjust) the weight W. In some embodiments, the training logic 100 may normalize the weight W of each of the plurality of layers Ls based on the entire weight included in the first artificial neural network model NN1. For example, normalization may be performed by setting a number of weights of the entire first artificial neural network model NN1 to 1. In some embodiments, the training logic 100 may adjust the weight W of each of the plurality of layers Ls and store the adjusted weight W of each of the plurality of layers Ls in the memory system 17. When the neural network device 13 continuously adjusts the weight W according to a variation in the pruning rate PR, the weight W of each of the plurality of layers Ls may be repeatedly read and written via the memory system 17 and processing speed may be decreased accordingly.

At least some processing of the neural network device 13 may be performed by using the memory system 17. For example, when the neural network device 13 outputs a pruning rate PR, the memory system 17 may update the weight W based on the received pruning rate PR and output the updated weight (e.g., updated weight W' of FIG. 16) to the neural network device 13. As another example, when the neural network device 13 outputs an updated weight (e.g., updated weight W' of FIG. 16), the memory system 17 may update the pruning rate PR to correspond to the updated weight. For example, the memory system 17 may update at least one of a weight W, a pruning rate PR, and a sensitivity based on a value received from the neural network device 13.

The memory system 17 may include a host processor 171, a plurality of logic layers 172, and a plurality of memory stacks 173. In some embodiments, each of the logic layers 172 may implement a memory controller and/or other logic that interacts with the host processor 171 and the plurality of memory stacks 173. In some embodiments, each of the plurality of memory stacks 173 may include a plurality of memory devices (e.g., DRAM memory). Each logic layer 172 may be electrically connected to a corresponding memory stack 173.

The host processor 171 may receive a weight W included in a plurality of layers Ls from the neural network device 13 via the bus 16. In addition, the host processor 171 may receive, from the CPU 11, an address ADDR used to store necessary values for operation of an artificial neural network or training of an artificial neural network. For example, the address ADDR may include information about an address of the memory stack 173 corresponding to a certain weight.

According to an embodiment, the host processor 171 may calculate a pruning rate and a sensitivity based on the received weight W. The host processor 171 may store the calculated pruning rate PR and sensitivity in the memory stack 173 corresponding to the address ADDR.

According to another embodiment, the host processor 171 may receive the weight W and the address ADDR included in a plurality of layers Ls. The host processor 171 may output the weight W allocated to each address ADDR to the logic layer 172 including the memory stack 173 corresponding to the address ADDR. The logic layer 172 may calculate a pruning rate PR and sensitivity based on the received weight W. The logic layer 172 may store the calculated pruning rate PR and sensitivity in the memory stack 173 corresponding to the address ADDR.

When a read request is received from the CPU 11, the memory system 17 may output information about a pruning rate PR, sensitivity, and a weight W stored in the memory stack 173 corresponding to the read request.

Figure 14:
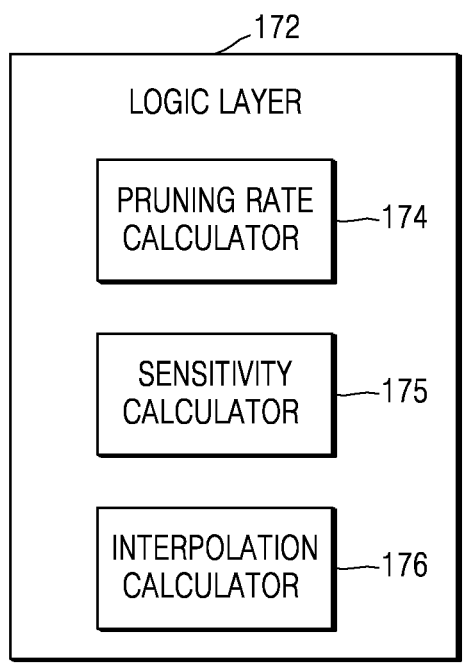
FIG. 14 is a block diagram of a logic layer, according to an example embodiment of the inventive concept.

FIG. 14 is a block diagram of a logic layer according to an embodiment of the inventive concept. The present embodiment will be described based on the reference numerals of the drawings described above.

Referring to FIG. 14, the logic layer 172 may include a pruning rate calculator 174, a sensitivity calculator 175, and an interpolation calculator 176. The logic layer 172 may perform similar operations as those of the training logic 100 described above. For example, the pruning rate calculator 174 may perform an operation similar to that of the pruning controller 120 described with reference to FIG. 4. For example, the pruning rate calculator 174 may calculate an optimal pruning rate OP based on received first and second sensitivity data SD1 and SD2. The sensitivity calculator 175 may calculate the first and second sensitivity data SD1 and SD2 based on the first artificial neural network model NN1 and a plurality of layers Ls. In addition, the sensitivity calculator 175 may also calculate a target sensitivity TS based on a target pruning rate TP. The interpolation calculator 176 may interpolate a plurality of sensitivity values to generate first sensitivity data SD1 and second sensitivity data SD2. In addition, the interpolation calculator 176 may interpolate a plurality of pruning rates to generate pruning data PD.

According to an embodiment, the host processor 171 may include the pruning rate calculator 174, the sensitivity calculator 175, and the interpolation calculator 176. For example, the host processor 171 may perform the calculation of a pruning rate, calculation of sensitivity, and an interpolation operation described above in a similar manner.

Figure 15:
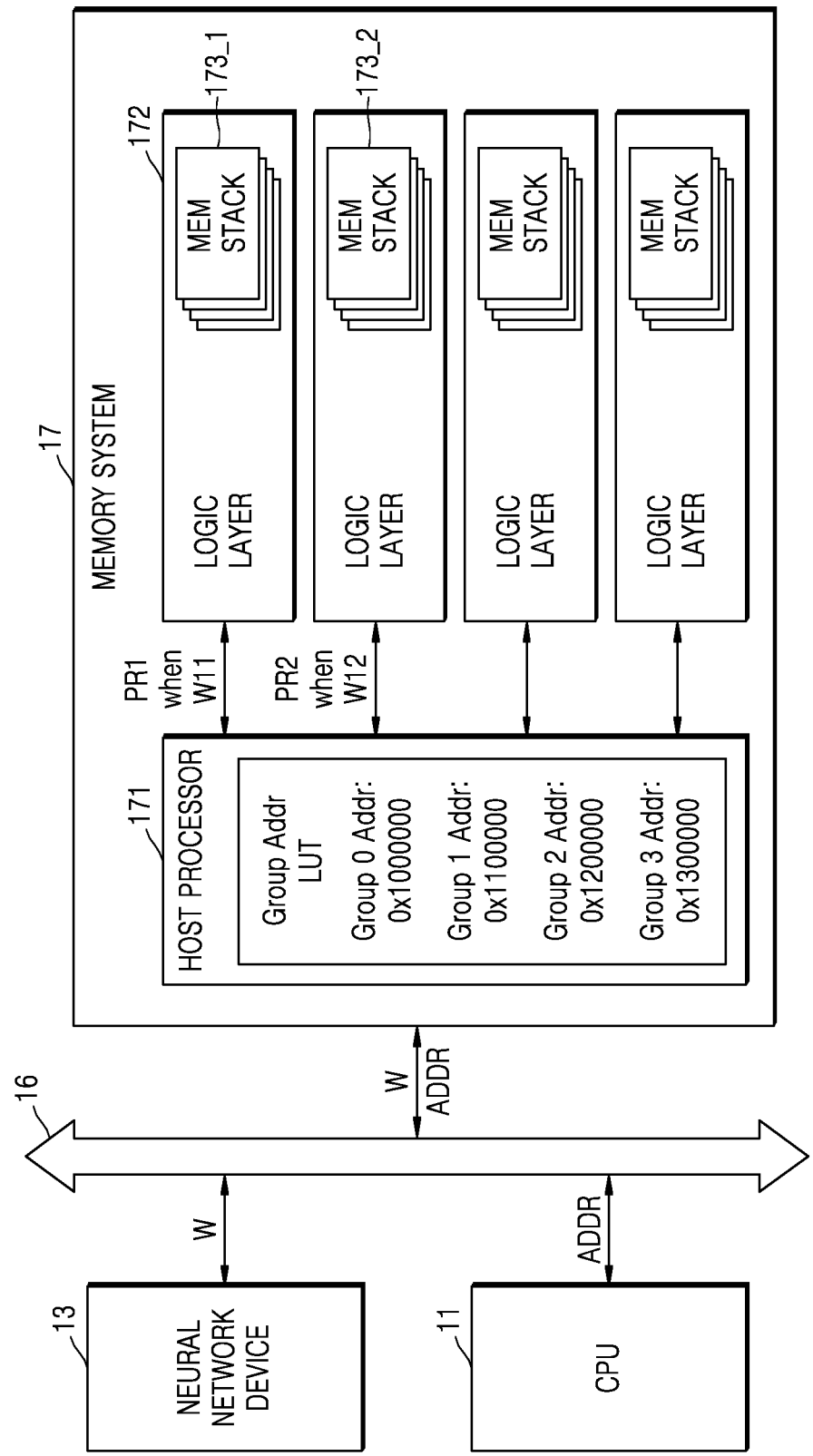
FIG. 15 is a block diagram of a memory system for calculating a pruning rate by receiving an original weight, according to an example embodiment of the inventive concept.

FIG. 15 is a block diagram of a memory system for calculating a pruning rate by receiving an original weight according to an example embodiment of the inventive concept.

According to an embodiment of the inventive concept, the neural network device 13 may output a weight W. In some embodiments, the original weight W may be output to a first logic layer 173. The weight W may be implemented, for example, in a matrix and include matrix values W11, W12, W21, and W22, and the matrix values may respectively correspond to weight values. The CPU 11 may output an address ADDR. In some embodiments, the address ADDR may be a look-up table (LUT) including a plurality of addresses ADDRs. The address ADDR may include, for example, a first address (e.g., Group 0 Addr) corresponding to a first weight value W11 and a second address (e.g., Group 1 Addr) corresponding to a second weight value W12. In addition, the address ADDR may include a third address (e.g., Group 2 Addr) and a fourth address (e.g., Group 3 Addr). The weight W output by the neural network device 13 and the address ADDR output by the CPU 11 may be received by the host processor 171 of the memory system 17.

According to an embodiment of the inventive concept, the host processor 171 may allocate each memory stack 173 to a plurality of groups. For example, a first memory stack 173_1 may be allocated to a first group, and a second memory stack 173_2 may be allocated to a second group. In addition, the host processor 171 may allocate at least one address ADDR value to a group. For example, the first address (e.g., Group 0 Addr) may be allocated to the first group, and the second address (e.g., Group 1 Addr) may be allocated to the second group.

According to an embodiment of the inventive concept, the host processor 171 may calculate a pruning rate based on the received weight W. For example, a first pruning rate PR1 may be calculated based on the first weight value W11, and a second pruning rate PR2 may be calculated based on the second weight value W12. The host processor 171 may store a weight value and a pruning rate value corresponding to the weight value in the memory stack 173. For example, a first pruning rate PR1 may be calculated based on the first weight value W11 of the first group, and the first weight value W11 and the first pruning rate PR1 may be stored in the memory stack 173_1 of the first group. As another example, a second pruning rate PR2 may be calculated based on the second weight value W12 of the second group, and the second weight value W12 and the second pruning rate PR2 may be stored in the memory stack 173_2 of the second group.

Figure 16:
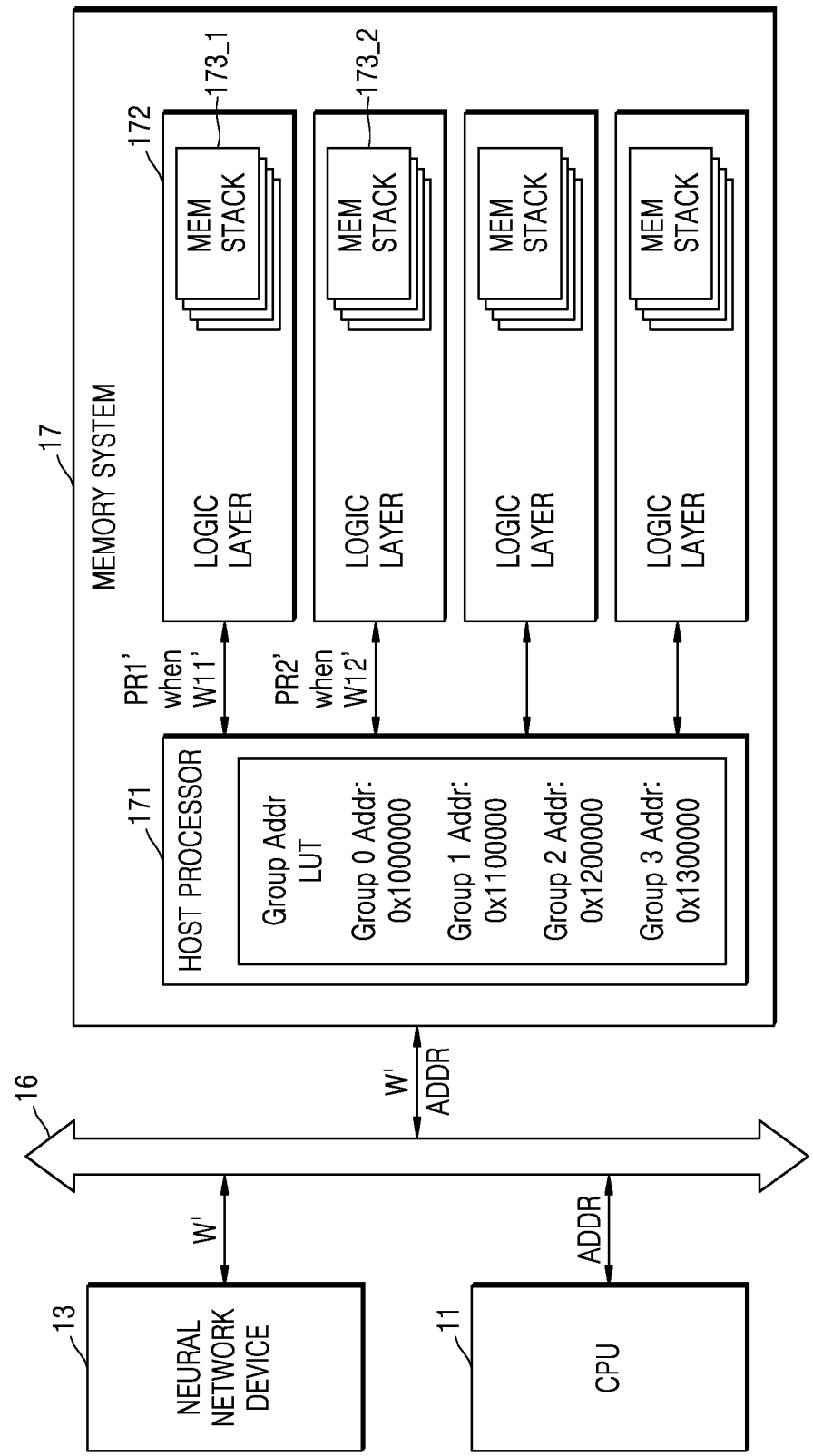
FIG. 16 is a block diagram of a memory system for calculating a pruning rate by receiving a corrected weight, according to an example embodiment of the inventive concept.

FIG. 16 is a block diagram of a memory system for calculating a pruning rate by receiving a corrected weight, according to an example embodiment of the inventive concept. The present embodiment will be described based on the reference numerals of the drawings described above.

Referring to FIG. 16, the neural network device 13 may output a corrected weight W'. For example, the neural network device 13 may perform training on an artificial neural network model to correct an original weight W and output a corrected weight W'.

The host processor 171 may calculate a pruning rate based on the corrected weight W'. For example, the host processor 171 may output pruning rates PR1' and PR2' that are respectively different from pruning rates PR1 and PR2 output based on the original weight W. The host processor 171 may store a corrected weight value and a pruning rate value corresponding to the corrected weight value in the memory stack 173. For example, a first pruning rate PR1' may be calculated based on the first weight value W11' of the first group, and the first weight value W11' and the first pruning rate PR1' may be stored in the memory stack 173_1 of the first group. As another example, a second pruning rate PR2' may be calculated based on the second weight value W12' of the second group, and the second weight value W12' and the second pruning rate PR2' may be stored in the memory stack 173_2 of the second group.

Figure 17:
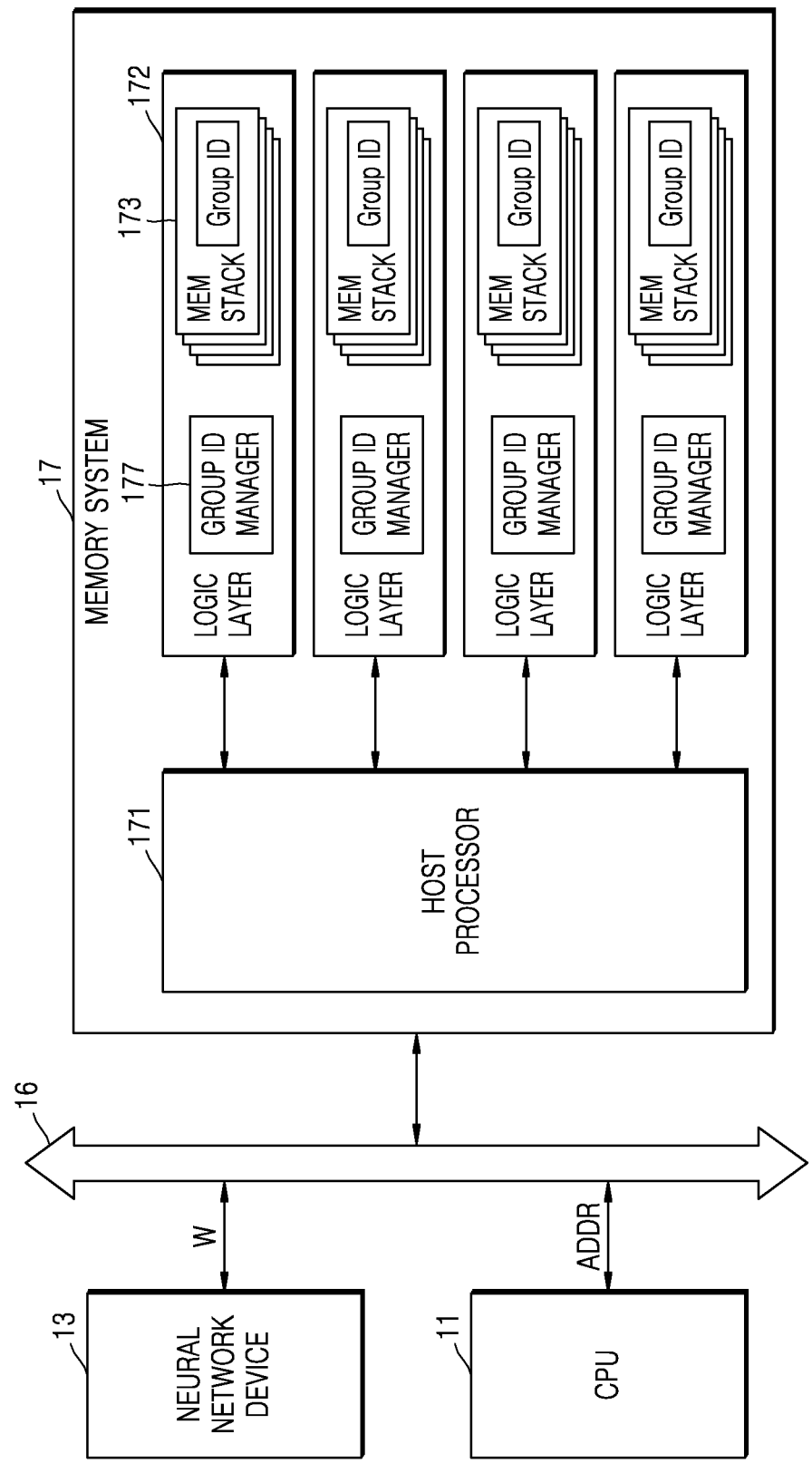
FIG. 17 is a block diagram of a memory system including a group ID manager, according to an example embodiment of the inventive concept.

FIG. 17 is a block diagram of a memory system including a group ID manager, according to an example embodiment of the inventive concept. The present embodiment will be described based on the reference numerals of the drawings described above.

Referring to FIG. 17, the logic layer 172 may further include a group ID manager 177, and each memory stack 173 may be allocated a group ID.

According to an embodiment of the inventive concept, the group ID manager 177 may analyze an address ADDR received from the CPU 11, and may store a pruning rate, sensitivity, and a weight in the memory stack 173 corresponding to the group ID manager 177. For example, the group ID manager 177 may analyze the address ADDR to obtain address values corresponding to the weight W received from the neural network device 13. The group ID manager 177 may identify an address value corresponding to a certain group ID received from the host processor 171. For example, a group ID may include a plurality of address values. The group ID manager 177 may identify address values corresponding to group IDs of the memory stack 173 corresponding to the group ID manager 177, and certain weight values may be stored in the memory stack 173. Meanwhile, the group ID manager 177 may store a pruning rate and sensitivity corresponding to the certain weight values in the memory stack 173.

While the inventive concept has been particularly shown and described with reference to embodiments thereof, it will be understood that various changes in form and details may be made therein without departing from the spirit and scope of the following claims.

What is claimed is:

1. A computing device for training an artificial neural network model, the computing device comprising:
   a model analyzer configured to receive a first artificial neural network model and split the first artificial neural network model into a plurality of layers;
   training logic configured to calculate first sensitivity data varying as the first artificial neural network model is pruned, calculate a target sensitivity corresponding to a target pruning rate based on the first sensitivity data, calculate second sensitivity data varying as each of the plurality of layers of the first artificial neural network model is pruned, and output, based on the second sensitivity data, an optimal pruning rate of each of the plurality of layers, the optimal pruning rate corresponding to the target pruning rate; and
   a model updater configured to prune the first artificial neural network model based on the optimal pruning rate to obtain a second artificial neural network model, and output the second artificial neural network model.

2. The computing device of claim 1,
   wherein the plurality of layers comprise a first layer having a first sensitivity and a second layer having a second sensitivity, the second sensitivity being lower than the first sensitivity,
   wherein the optimal pruning rate comprises a first optimal pruning rate of the first layer and a second optimal pruning rate of the second layer, and
   wherein the second optimal pruning rate is higher than the first optimal pruning rate.

3. The computing device of claim 1, wherein the training logic is further configured to apply a plurality of pruning rate values to the first artificial neural network model and the plurality of layers, obtain a plurality of sensitivity values, and interpolate the plurality of sensitivity values to calculate the first sensitivity data and the second sensitivity data.

4. The computing device of claim 1, wherein the training logic is further configured to obtain pruning rate data, which is in an inverse functional relationship with the second sensitivity data, calculate the optimal pruning rate from the pruning rate data based on the target sensitivity, and output the optimal pruning rate.

5. The computing device of claim 1, wherein the training logic is further configured to adjust a weight of each of the plurality of layers in accordance with the output of the optimal pruning rate.

6. The computing device of claim 5, wherein the training logic is further configured to normalize the weight of each of the plurality of layers based on the entire weight included in the first artificial neural network model.

7. The computing device of claim 5, further comprising:
a memory comprising a processor,
wherein the processor is configured to adjust the weight to provide an adjusted weight and store the adjusted weight in the memory.

8. A computing device for training an artificial neural network model, the computing device comprising:
a model analyzer configured to receive a first artificial neural network model and split the first artificial neural network model into a plurality of layers;
training logic configured to receive a target pruning rate, calculate a target sensitivity of the first artificial neural network model, the target sensitivity corresponding to the target pruning rate, and output an optimal pruning rate of each of the plurality of layers, the optimal pruning rate corresponding to the target sensitivity; and
a model updater configured to prune the first artificial neural network model based on the optimal pruning rate to obtain a second artificial neural network model, and output the second artificial neural network model.

9. The computing device of claim 8, wherein the training logic further comprises:
a sensitivity analyzer that analyzes the first artificial neural network model to output first sensitivity data varying according to a pruning rate and analyzes each of the plurality of layers to output second sensitivity data varying according to the pruning rate.

10. The computing device of claim 9,
wherein the training logic is further configured to output the optimal pruning rate based on the target pruning rate, the first sensitivity data, and the second sensitivity data, and the optimal pruning rate is allocated to each of the plurality of layers.

11. The computing device of claim 9, wherein the sensitivity analyzer is further configured to apply a plurality of pruning rates to the first artificial neural network model and each of the plurality of layers, obtain a plurality of sensitivity values, and interpolate the plurality of sensitivity values to calculate the first sensitivity data and the second sensitivity data.

12. The computing device of claim 9, further comprising:
a pruning controller,
wherein the pruning controller comprises:
a target sensitivity calculator configured to output the target sensitivity based on the first sensitivity data and the target pruning rate; and
an optimal pruning rate calculator configured to output the optimal pruning rate based on the second sensitivity data and the target sensitivity.

13. The computing device of claim 12,
wherein the optimal pruning rate calculator is further configured to obtain pruning rate data, which is in an inverse functional relationship with the second sensitivity data, and pruning rate data comprises a pruning rate according to a variation in sensitivity data of each of the plurality of layers, and
wherein the optimal pruning rate calculator is further configured to apply the target sensitivity to the pruning rate data and output the optimal pruning rate of each of the plurality of layers.

14. The computing device of claim 8,
wherein the plurality of layers comprise a first layer and a second layer having a lower sensitivity than the first layer,
wherein the optimal pruning rate comprises a first optimal pruning rate of the first layer and a second optimal pruning rate of the second layer, and
wherein the second optimal pruning rate is higher than the first optimal pruning rate.

15. The computing device of claim 14, further comprising:
a memory,
wherein the model analyzer outputs a first weight of each of the plurality of layers, and
wherein the training logic is further configured to calculate a second weight, which is obtained by updating the first weight based on the optimal pruning rate, and store the second weight and the optimal pruning rate corresponding to the second weight in the memory.

16. The computing device of claim 8, wherein the training logic is further configured to adjust a weight of each of the plurality of layers in accordance with the output of the optimal pruning rate.

17. A method of training an artificial neural network model, the method comprising:
receiving a target pruning rate;
pruning a first artificial neural network model;
calculating first sensitivity data varying according to a pruning rate of the first artificial neural network model as the first artificial neural network model is pruned;
calculating a target sensitivity corresponding to the target pruning rate from the first sensitivity data;
splitting the first artificial neural network model into a plurality of layers;
calculating second sensitivity data varying as each of the plurality of layers is pruned;
calculating an optimal pruning rate of each of the plurality of layers corresponding to the target sensitivity based on the second sensitivity data;
pruning the first artificial neural network model based on the optimal pruning rate to obtain a second artificial neural network model; and
outputting the second artificial neural network model.

18. The method of claim 17,
wherein the plurality of layers comprise a first layer having a first sensitivity and a second layer having a second sensitivity, the second sensitivity being lower than the first sensitivity,
wherein the optimal pruning rate comprises a first optimal pruning rate of the first layer and a second optimal pruning rate of the second layer, and
wherein the second optimal pruning rate is higher than the first optimal pruning rate.

19. The method of claim 18, wherein the calculating of the first sensitivity data varying according to the pruning rate of the first artificial neural network model further comprises:
splitting the pruning rate into unit intervals;
analyzing a variation of data output from the first artificial neural network model in each of the unit intervals;
obtaining sensitivity values;
interpolating the sensitivity values; and calculating the first sensitivity data based on the sensitivity values that are interpolated.

20. The method of claim 18, wherein the calculating of the second sensitivity data varying according to the pruning rate of each of the plurality of layers further comprises:
   inputting data to the first artificial neural network model;
   applying pruning rates, which are split into unit intervals, to the plurality of layers, respectively;
   analyzing a variation of data output from the first artificial neural network model;
   obtaining sensitivity values;
   interpolating the sensitivity values; and
   calculating the second sensitivity data based on the sensitivity values that are interpolated.

* * * * *